(12) United States Patent
Kroeger

(10) Patent No.: US 7,680,201 B2
(45) Date of Patent: Mar. 16, 2010

(54) FORWARD ERROR CORRECTION CODING FOR AM 9KHZ AND 10KHZ IN-BAND ON-CHANNEL DIGITAL AUDIO BROADCASTING SYSTEMS

(75) Inventor: Brian William Kroeger, Sykesville, MD (US)

(73) Assignee: iBiquity Digital Corporation, Columbia, MD (US)

( * ) Notice: Subject to any disclaimer, the term of this patent is extended or adjusted under 35 U.S.C. 154(b) by 0 days.

(21) Appl. No.: 12/025,130

(22) Filed: Feb. 4, 2008

(65) Prior Publication Data

US 2008/0175331 A1   Jul. 24, 2008

Related U.S. Application Data

(63) Continuation-in-part of application No. 10/764,629, filed on Jan. 26, 2004, now Pat. No. 7,340,010.

(51) Int. Cl.
    *H04L 5/12* (2006.01)
(52) U.S. Cl. .................................. 375/261; 375/260
(58) Field of Classification Search ................ 375/265, 375/268, 270, 300, 295, 320, 307, 308, 342, 375/364, 260, 261, 316; 714/790, 793, 792; 455/227.1, 501
See application file for complete search history.

(56) References Cited

U.S. PATENT DOCUMENTS

| 5,588,022 | A | 12/1996 | Dapper et al. |
| 6,005,894 | A | 12/1999 | Kumar |
| 6,108,810 | A | 8/2000 | Kroeger et al. |
| 6,229,824 | B1 | 5/2001 | Marko |
| 6,243,424 | B1 | 6/2001 | Kroeger et al. |

(Continued)

FOREIGN PATENT DOCUMENTS

EP   0991221 A2   4/2000

(Continued)

OTHER PUBLICATIONS

S. Kallel, "Complementary Punctured Convolutional (CPC) Codes and Their Applications", IEEE Trans. Comm., vol. 43, No. 6, Jun. 1995, pp. 2005-2009.

B. Kroeger et al., "Robust Modem and Coding Techniques For FM Hybrid IBOC DAB," IEEE Trans. on Broadcasting, vol. 43, No. 4, Dec. 1997, pp. 412-420.

(Continued)

*Primary Examiner*—David C Payne
*Assistant Examiner*—Rahel Guarino
(74) *Attorney, Agent, or Firm*—Robert P. Lenart, Esq.; Pietragallo Gordon Alfano Bosick & Raspanti, LLP

(57) ABSTRACT

A method of broadcasting an AM compatible digital audio broadcasting signal includes: producing an analog modulated carrier signal centrally positioned in a radio channel, wherein the analog modulated carrier signal is modulated by an analog signal, producing a plurality of digitally modulated subcarrier signals in the radio channel, wherein the digitally modulated subcarrier signals are modulated using complementary pattern-mapped trellis code modulation (CPTCM) including a code mapped to overlapping partitions including an upper main partition, a lower main partition, an upper backup partition and a lower backup partition, and a non-overlapping tertiary partition, and transmitting the analog modulated carrier signal and the plurality of digitally modulated subcarrier signals. Transmitters that broadcast the signal and receivers that receive the signal, and the reception method are also included.

14 Claims, 15 Drawing Sheets

U.S. PATENT DOCUMENTS

| | | | |
|---|---|---|---|
| 6,345,377 | B1 | 2/2002 | Kroeger et al. |
| 6,347,122 | B1 | 2/2002 | Chen et al. |
| 6,351,500 | B2 | 2/2002 | Kumar |
| 6,353,637 | B1 * | 3/2002 | Mansour et al. ............. 375/260 |
| 6,430,227 | B1 | 8/2002 | Kroeger et al. |
| 6,430,401 | B1 | 8/2002 | Lou et al. |
| 6,445,693 | B1 * | 9/2002 | Sarraf et al. ................ 370/343 |
| 6,445,750 | B1 | 9/2002 | Chen et al. |
| 6,487,256 | B2 * | 11/2002 | Kroeger et al. ............. 375/265 |
| 6,523,147 | B1 | 2/2003 | Kroeger et al. |
| 6,603,826 | B1 | 8/2003 | Cupo et al. |
| 7,043,681 | B2 | 5/2006 | Kroeger |
| 2001/0021231 | A1 | 9/2001 | Kroeger et al. |
| 2002/0039389 | A1 | 4/2002 | Chen et al. |
| 2003/0108123 | A1 | 6/2003 | Kroeger et al. |

FOREIGN PATENT DOCUMENTS

| | | |
|---|---|---|
| EP | 1014590 A2 | 6/2000 |
| EP | 1041756 A2 | 10/2000 |
| EP | 1059748 A2 | 12/2000 |
| EP | 1109344 A2 | 6/2001 |

OTHER PUBLICATIONS

B. Chen et al., "Complementary Punctured-Pair Convolutional Codes for Digital Audio Broadcasting", IEEE Trans. Comm., vol. 48, No. 11, Nov. 2000, pp. 1829-1839.

J. N. Laneman et al., "Soft Selection Combining for Terrestrial Digital Audio Broadcasting in the FM Band", IEEE Trans. on Broadcasting, vol. 47, No. 2, Jun. 2001, pp. 103-114.

* cited by examiner

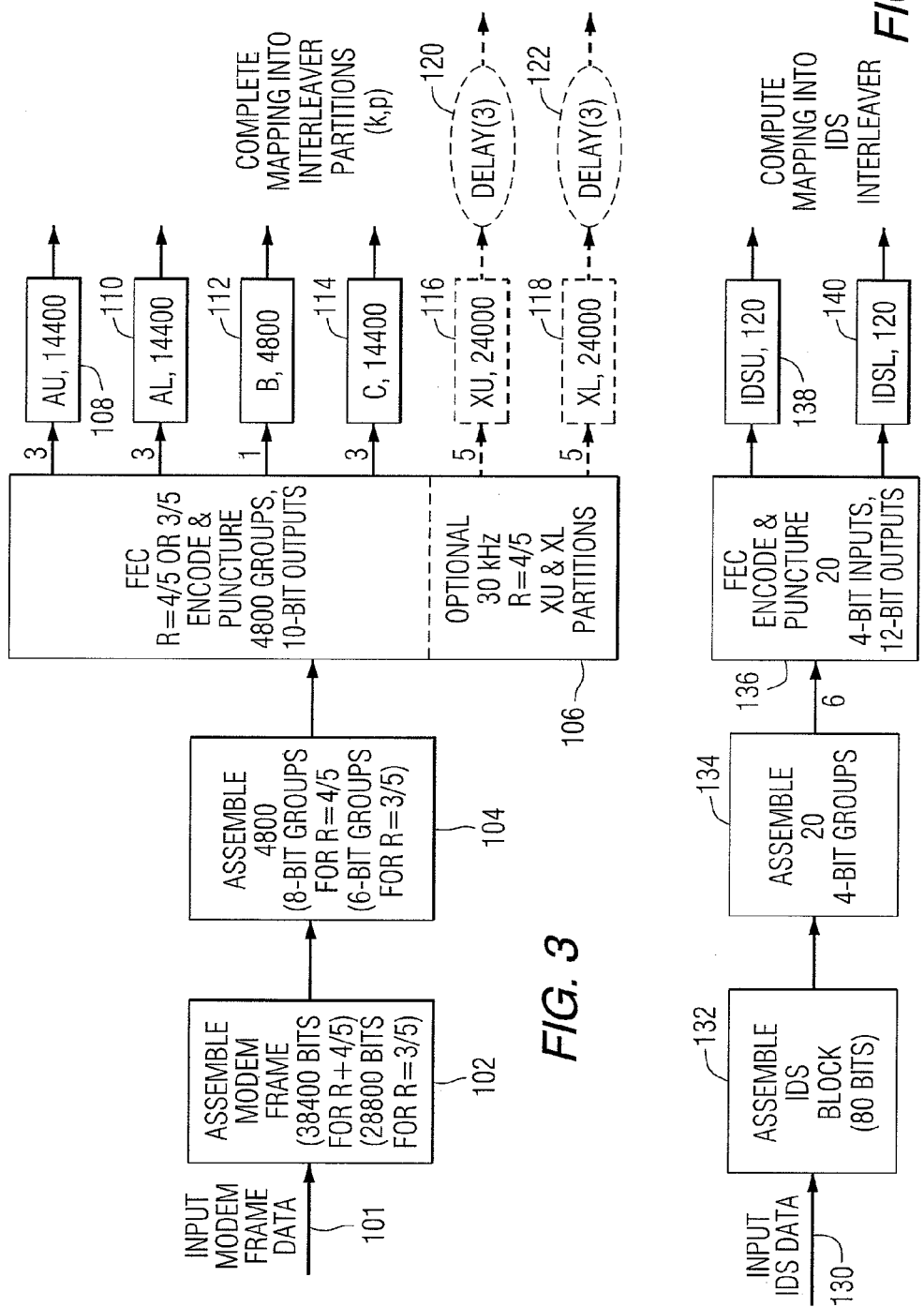

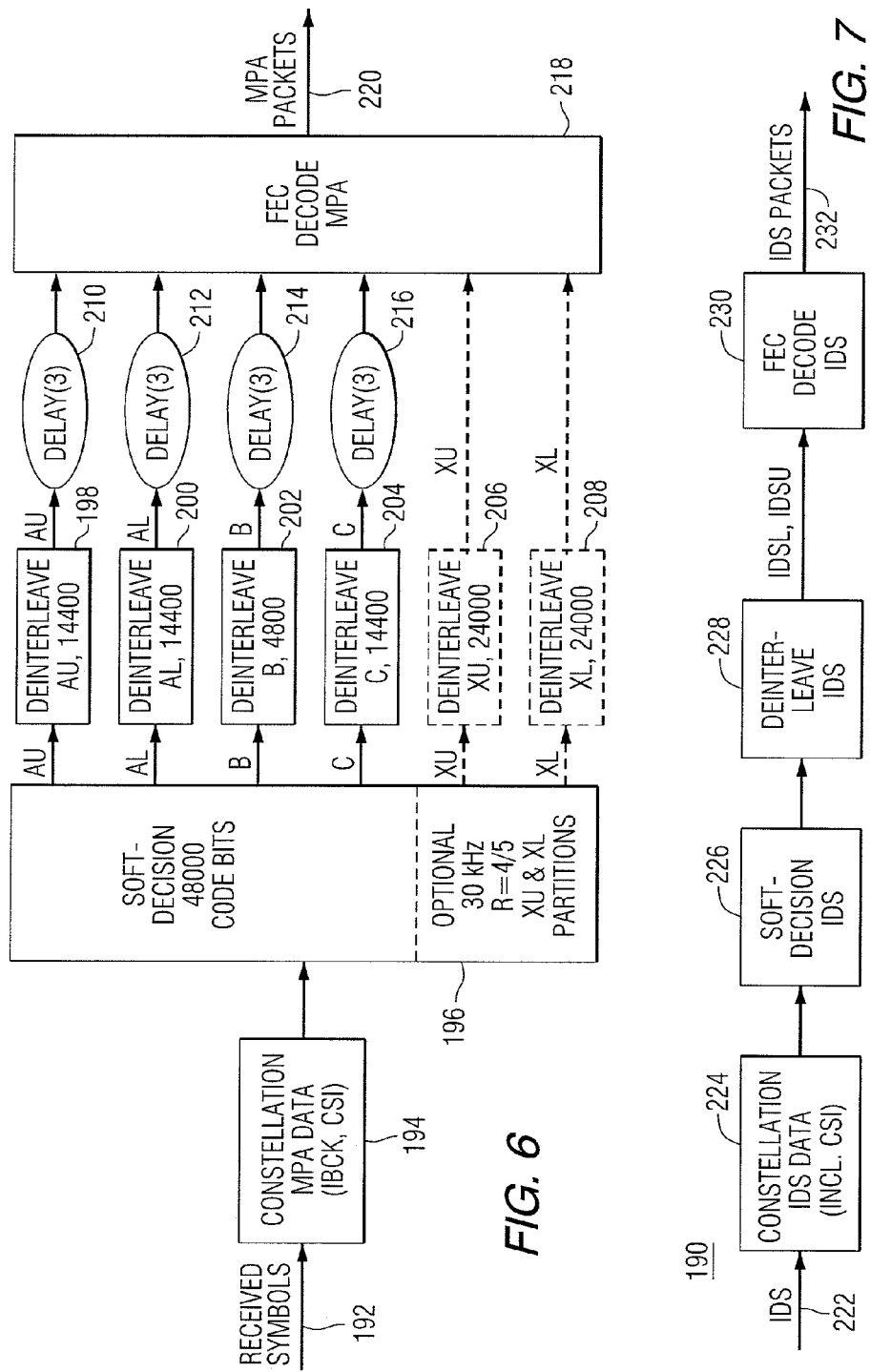

FORWARD ERROR CORRECTION CODING FOR AM 9KHZ AND 10KHZ IN-BAND ON-CHANNEL DIGITAL AUDIO BROADCASTING SYSTEMS

CROSS REFERENCE TO RELATED APPLICATION

This application is a continuation-in-part of U.S. patent application Ser. No. 10/764,629, for "Forward Error Correction Coding For Hybrid AM In-Band On-Channel Digital Audio Broadcasting Systems", filed Jan. 26, 2004, which is hereby incorporated by reference.

FIELD OF THE INVENTION

This invention relates to methods and apparatus for digital audio broadcasting, and more particularly to such methods and apparatus for broadcasting AM compatible in-band on-channel (IBOC) digital audio broadcasting (DAB) signals.

BACKGROUND OF THE INVENTION

Digital audio broadcasting (DAB) is a medium for providing digital-quality audio, superior to existing analog broadcasting formats. AM in-band, on-channel (IBOC) DAB can be transmitted in a hybrid format where a digitally modulated signal coexists with the AM signal, or it can be transmitted in an all-digital format where the removal of the analog signal enables improved digital coverage with reduced interference. The hybrid format allows existing receivers to continue to receive the AM signal while allowing new IBOC receivers to decode the DAB signal. IBOC DAB requires no new spectral allocations because each DAB signal is simultaneously transmitted within the spectral mask of an existing AM channel allocation. IBOC DAB promotes economy of spectrum while enabling broadcasters to supply digital quality audio to their present base of listeners.

U.S. Pat. No. 5,588,022 teaches a method for simultaneously broadcasting analog and digital signals in a standard AM broadcasting channel. The DAB signal comprises an amplitude modulated radio frequency signal including a first subcarrier modulated by an analog program signal and having a first frequency spectrum, and a plurality of digitally modulated subcarrier signals that are broadcast within a bandwidth that encompasses the first frequency spectrum. The digitally modulated subcarrier signals are modulated by a digital program signal. A first group of the digitally modulated subcarrier signals lies within the first frequency spectrum and is modulated in quadrature with the first subcarrier signal. Second and third groups of the digitally modulated subcarrier signals lie outside of the first frequency spectrum and are modulated both in-phase and in-quadrature with the first subcarrier signal. U.S. Pat. No. 6,243,424 discloses another embodiment of an AM Digital Audio Broadcasting system.

A method and apparatus for forward error correction coding for an AM in-band on-channel (IBOC) digital audio broadcasting (DAB) system is described in U.S. Pat. No. 6,523,147, the disclosure of which is hereby incorporated by reference. A digital audio broadcasting method using puncturable convolutional code is described in U.S. Pat. Nos. 6,108,810 and 6,345,377, the disclosures of which are hereby incorporated by reference.

The present invention seeks to provide an AM IBOC DAB signal that can accommodate various interference scenarios as well as transmitters and receivers that utilize the signal.

SUMMARY OF THE INVENTION

In a first aspect, the invention provides a method of broadcasting an AM compatible digital audio broadcasting signal. The method includes: producing an analog modulated carrier signal centrally positioned in a radio channel, wherein the analog modulated carrier signal is modulated by an analog signal, producing a plurality of digitally modulated subcarrier signals in the radio channel, wherein the digitally modulated subcarrier signals are modulated using complementary pattern-mapped trellis code modulation (CPTCM) including a code mapped to overlapping partitions including an upper main partition, a lower main partition, an upper backup partition and a lower backup partition, and a non-overlapping tertiary partition, and transmitting the analog modulated carrier signal and the plurality of digitally modulated subcarrier signals.

In another aspect, the invention provides a transmitter for broadcasting an AM compatible digital audio broadcasting signal. The transmitter includes a processor for modulating a plurality of subcarriers using complementary pattern-mapped trellis code modulation (CPTCM) including a code mapped to overlapping partitions including an upper main partition, a lower main partition, an upper backup partition and a lower backup partition, and a non-overlapping tertiary partition, and a transmitter for transmitting an analog modulated carrier signal and the plurality of digitally modulated subcarrier signals.

In another aspect, the invention provides a method of receiving an AM compatible digital audio broadcasting signal. The method includes: receiving an analog modulated carrier signal centrally positioned in a radio channel, and a plurality of digitally modulated subcarrier signals in the radio channel, wherein the digitally modulated subcarrier signals are modulated using complementary pattern-mapped trellis code modulation (CPTCM) including a code mapped to overlapping partitions including an upper main partition, a lower main partition, an upper backup partition and a lower backup partition, and a non-overlapping tertiary partition, and demodulating the analog modulated carrier signal and the plurality of digitally modulated subcarrier signals; and producing an output signal in response to the demodulating step.

In another aspect, the invention provides a receiver receiving an AM compatible digital audio broadcasting signal. The receiver includes an input for receiving an analog modulated carrier signal centrally positioned in a radio channel, and a plurality of digitally modulated subcarrier signals in the radio channel, wherein the digitally modulated subcarrier signals are modulated using complementary pattern-mapped trellis code modulation (CPTCM) including a code mapped to overlapping partitions including an upper main partition, a lower main partition, an upper backup partition and a lower backup partition, and a non-overlapping tertiary partition; a demodulator for demodulating the plurality of subcarriers with the partitioned bits; and an output for producing an output signal in response to the demodulator.

BRIEF DESCRIPTION OF THE DRAWINGS

FIG. 3 is a block diagram illustrating the functionality of forward error correction (FEC) and interleaving for a 20 or 30 kHz AM IBOC system.

FIG. 4 is a block diagram illustrating the functionality of IBOC data service (IDS) channel FEC and interleaving for a 20 or 30 kHz AM IBOC system.

FIG. 6 is a block diagram illustrating the functionality of a deinterleaver and FEC decoder for a 20 or 30 kHz AM IBOC system.

FIG. 7 is a block diagram illustrating the functionality of IDS channel deinterleaver and FEC decoder for a 20 or 30 kHz AM IBOC system.

DETAILED DESCRIPTION OF THE INVENTION 20 kHz or 30 kHz Bandwidth System

Figure 1:
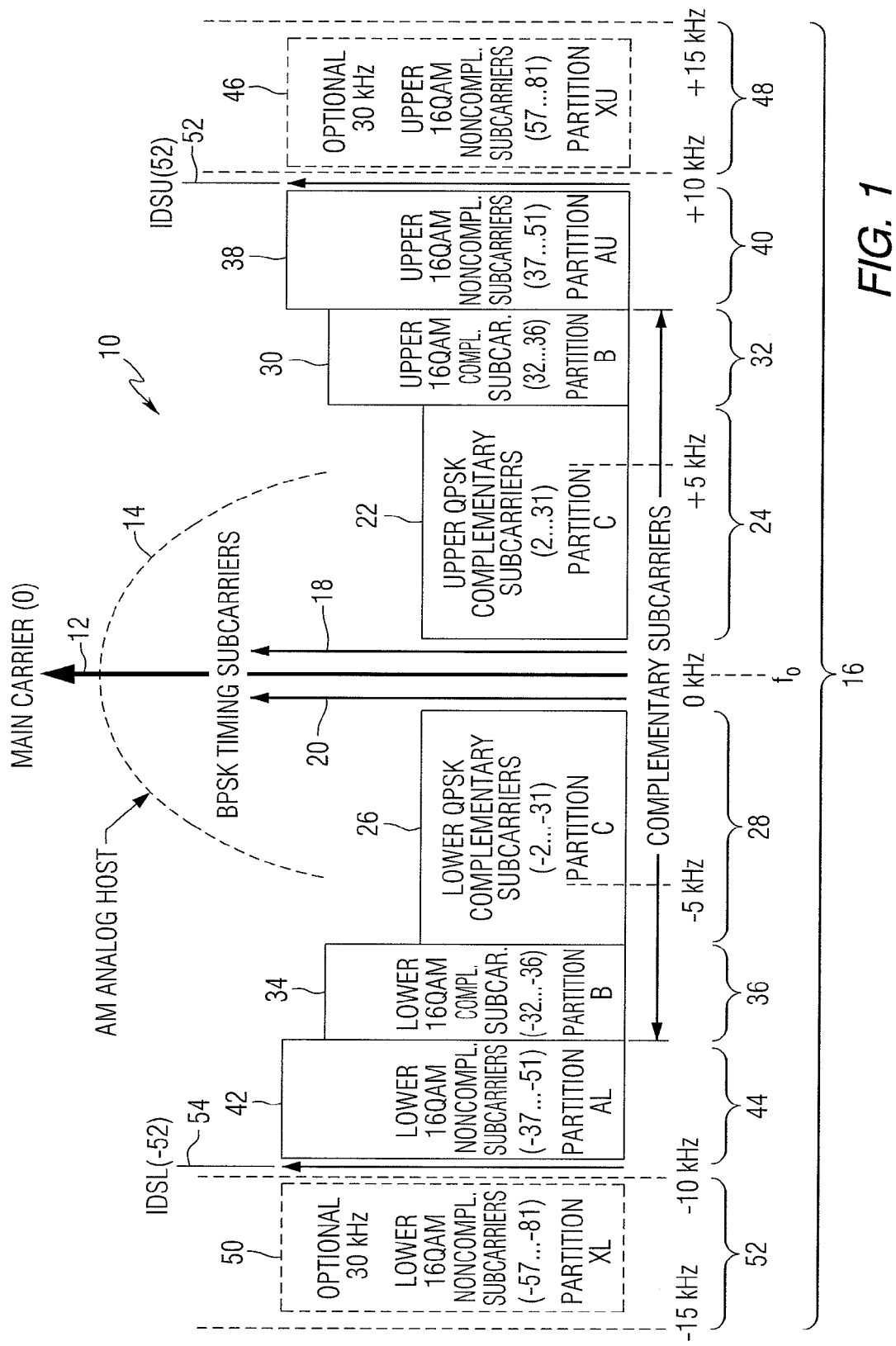
FIG. 1 is a schematic representation of partition and subcarrier assignments for a hybrid AM IBOC DAB signal in accordance with this invention.

In one aspect, this invention provides a single stream hybrid AM IBOC DAB system having a 20 or 30 kHz bandwidth and 25 and 19 kbps modes. The system broadcasts a waveform including an analog modulated carrier and a plurality of digitally modulated subcarriers in the same channel as the analog modulated carrier. The digital signal is divided into several partitions, which are mapped to groups of the subcarriers. Referring to the drawings, FIG. 1 is a schematic representation of the partition and subcarrier assignments for a hybrid 20 or 30 kHz AM IBOC signal.

The signal 10 includes an analog modulated carrier signal 12 that is modulated by an analog signal, resulting in an AM host signal generally indicated by line 14. The signal further includes a plurality of subcarriers at evenly spaced positions (numbered −81 to +81, and spanning a bandwidth of about 30 kHz) in the radio channel 16. BPSK modulated timing subcarriers 18 and 20 are located at the subcarrier positions +1 and −1, closest to the analog modulated carrier. A first plurality of subcarrier signals 22 are located at positions 2 through 31 in a first portion 24 of the radio channel and a second plurality of subcarrier signals 26 are located at positions −2 through −31 in a second portion 28 of the radio channel. The first and second pluralities of subcarrier signals are complementary modulated QPSK subcarrier signals and have a power spectral density below the analog modulated carrier by at least a first margin.

A third plurality of subcarrier signals 30 are located at positions 32 through 36 in a third portion 32 of the radio channel and a fourth plurality of subcarrier signals 34 are located at positions −32 through −36 in a fourth portion 36 of the radio channel. The third and fourth pluralities of subcarrier signals are complementary modulated 16-QAM subcarrier signals and have a power spectral density below the analog modulated carrier by at least a second margin. Complementary modulated subcarriers in the lower sideband groups 26 and 34 are modulated as the mirror image (negative complex conjugate) of corresponding subcarriers in the upper sideband groups 22 and 30.

A fifth plurality of subcarrier signals 38 are located at positions 37 through 51 in a fifth portion 40 of the radio channel and a sixth plurality of subcarrier signals 42 are located at positions −37 through −51 in a sixth portion 44 of the radio channel. The fifth and sixth pluralities of subcarrier signals are 16-QAM modulated signals and have a power spectral density below the analog modulated carrier by at least a third margin. In one embodiment, the first margin is 50 dBc, the second margin is 43 dBc, and the third margin is 40 dBc.

The first, second, third, fourth, fifth and sixth pluralities of subcarrier signals are modulated by one or more digital signals. The digital signals can include a digital version of a program signal used to modulate the analog modulated carrier, as well as other digital signals.

An optional seventh plurality of subcarrier signals 46 can be located at positions 57 through 81 in a seventh portion 48 of the radio channel, and an optional eighth plurality of subcarrier signals 50 can be located at positions −57 through −81 in an eighth portion 44 of the radio channel. The seventh and eighth pluralities of subcarrier signals are 16-QAM modulated signals and have a power spectral density below the analog modulated carrier by at least the third margin. The subcarriers in the fifth, sixth, seventh and eighth portions of the channel are not complementary modulated.

An IBOC Data Service (IDS) subcarrier 52 is located at position 52 between the fifth and seventh pluralities of subcarriers, and an IBOC Data Service subcarrier 54 is located at a position −52 between the sixth and eighth pluralities of subcarriers. In one embodiment, the IBOC Data Service subcarriers have a power spectral density at least 40 dBc below the analog modulated carrier. The subcarriers at locations 53-56 are omitted because of first adjacent channel interference.

The AM IBOC DAB signal subcarriers are digitally modulated using COFDM (Coded Orthogonal Frequency Division Multiplexing). Each of the subcarriers is modulated using 16-QAM, QPSK or BPSK (subcarriers ±1 only) symbols. The digital information (e.g., audio) is forward error corrected (FEC) coded using complementary pattern-mapped trellis coded modulation (CPTCM), and then separated into partitions that are interleaved separately. The CPTCM method of FEC for the AM IBOC is based upon a combination of a code pattern-mapping technique described below, and the application of overlapping Complementary Puncture Codes to AM IBOC systems.

The partitions are identified by letters in FIG. 1. The digital information in partition C is used to modulate the first and second pluralities of subcarriers. The digital information in partition B is used to modulate the third and fourth pluralities of subcarriers. The digital information in partition AU is used to modulate the fifth plurality of subcarriers. The digital information in partition AL is used to modulate the sixth plurality of subcarriers. The digital information in partition XU is used to modulate the seventh plurality of subcarriers. The digital information in partition XL is used to modulate the eighth plurality of subcarriers. The partitions are mapped to subcarriers at particular power levels to minimize both host interference and interference to adjacent channels, while attempting to maximize coverage. Different interference scenarios will cause corruption to different partitions. The goal of the CPTCM coding and grouping into these partitions is to maximize coverage while minimizing interference.

The basic requirements for the CPTCM code include the ability to puncture the original code and map the code bits to the symbols in a manner that provides superior coding gain over a random mapping of the code bits. The CPTCM code must further include the ability to puncture the original code in various overlapping partitions including Main, Backup, Lower Sideband and Upper Sideband. Each of the overlapping partitions must survive as a good code as designed for typical interference and AM channel conditions. Partitions AL, AU, B and C form the Main component, while the optional XL and XU partitions form the Backup which is time diverse from the Main component. Furthermore, the lower AL and XL partitions can be completely corrupted while the AU and XU partitions can carry the signal. Similarly, the upper AU and XU partitions can be completely corrupted while the AL and XL partitions can carry the signal. The inner B and C partitions add coding gain to the A and X partitions. Various levels of corruption can be tolerated in likely interference scenarios.

Figure 2:
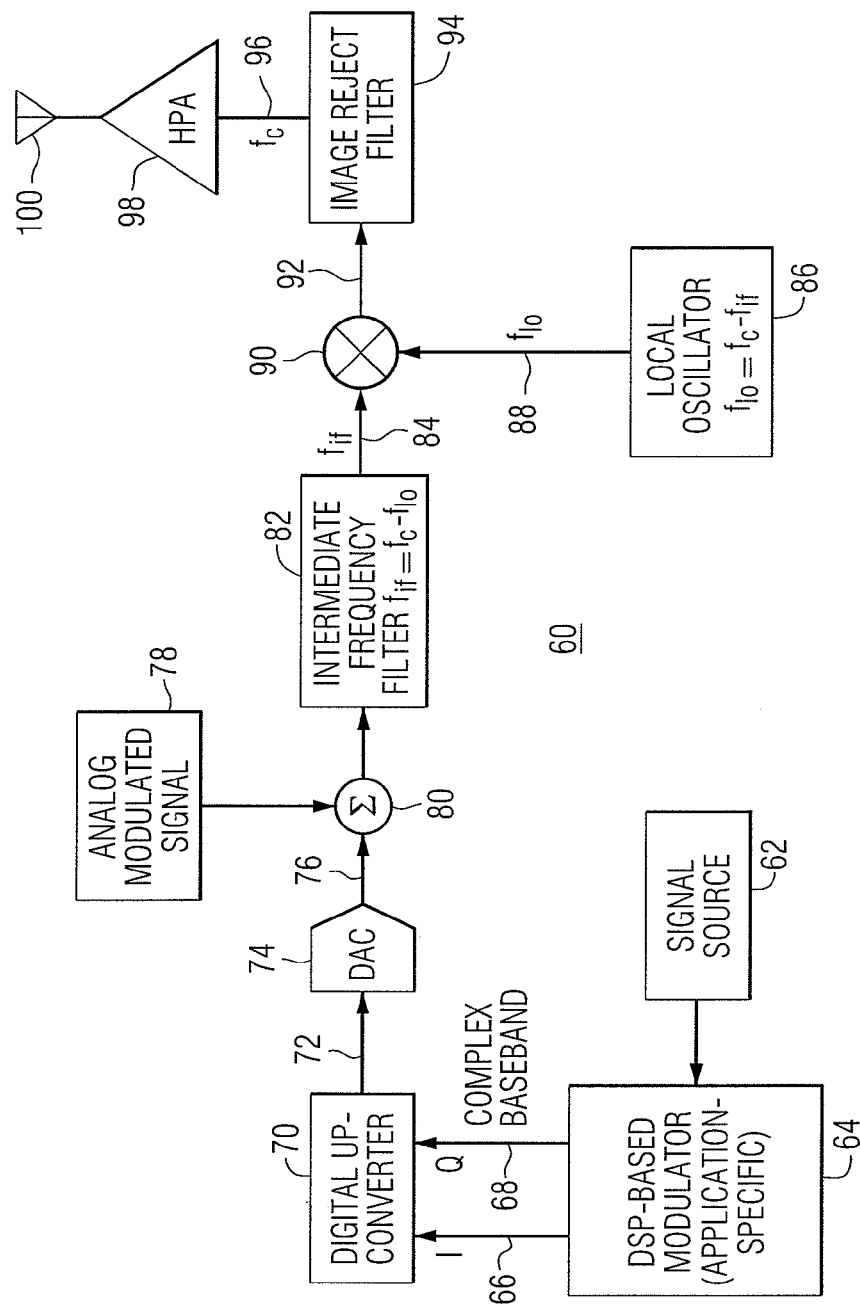
FIG. 2 is a functional block diagram of an AM IBOC DAB transmitter constructed in accordance with this invention.

FIG. 2 is a block diagram of a DAB transmitter 60 that can broadcast digital audio broadcasting signals in accordance with the present invention. A signal source 62 provides the signal to be transmitted. The source signal may take many forms, for example, an analog program signal and a digital program signal, and/or one or more other digital information signals. A digital signal processor (DSP) based modulator 64 processes the source signal in accordance with various signal processing techniques, such as source coding, interleaving and forward error correction, to produce in-phase and quadrature components of the complex base band signal on lines 66 and 68. These components are shifted up in frequency, filtered and interpolated to a higher sampling rate in up-converter block 70. This produces digital samples at a rate $f_s$, on intermediate frequency signal $f_{if}$ on line 72. Digital-to-analog converter 74 converts the signal to a plurality of digitally modulated subcarriers on line 76. The digitally modulated subcarriers are combined with an analog modulated signal 78 as illustrated by summation point 80. An intermediate frequency filter 82 rejects alias frequencies to produce the intermediate frequency signal $f_{if}$ on line 84. A local oscillator 86 produces a signal $f_{lo}$ on line 88, which is mixed with the intermediate frequency signal on line 84 by mixer 90 to produce sum and difference signals on line 92. Unwanted intermodulation components and noise are rejected by image reject filter 94 to produce the composite signal $f_c$ on line 96. A high power amplifier 98 then sends this signal to an antenna 100, which serves as a means for broadcasting the composite signal. The composite broadcast signal is shown in FIG. 1.

The Forward Error Correction (FEC) technique used in the AM IBOC (In-Band On-Channel) DAB (Digital Audio Broadcast) system of this invention is referred to as Complementary Pattern-mapped Trellis-Coded Modulation (CPTCM). CPTCM coding is designed to be compatible with the host analog signal and to accommodate the likely interference scenarios encountered in the AM IBOC channel. One particular mode of operation is intended for a single stream (25.8 or 19.3 kbps) of digital audio that can be broadcast within a 20 kHz RF bandwidth. The 25.8 kbps mode has an optional Backup extension partition in the outer portions of the sidebands, expanding the bandwidth to 30 kHz while providing Lower/Upper/Main/Backup diversity. The 20 kHz RF bandwidth mode reduces interference and has no second-adjacent channel interference issues relative to the 30 kHz mode. However, digital coverage and robustness are reduced relative to the 30 kHz mode, since there are insufficient code bits to accommodate Main/Backup diversity. The CPTCM code technique partitions a "mother code" into smaller code partitions in a manner which is much better than random interleaving.

Functional block diagrams illustrating the assembly and partitioning of information bits is shown in FIGS. 3 and 4. FIG. 3 is a block diagram illustrating the functionality of forward error correction (FEC) and interleaving for a 20 or 30 kHz AM IBOC system. Data to be transmitted is received as indicated by arrow 101. Block 102 shows that the data is assembled into modem frames containing either 38,400 bits for rate 4/5 coding, or 28,800 bits for rate 3/5 coding. Block 104 shows that the data in each modem frame is divided into groups. For rate 4/5 coding, the groups have 8 bits, and for rate 3/5 coding, the groups have 6 bits. Forward error correction encoding and puncturing is then performed as shown in block 106. This produces 4800 10-bit outputs for both rates 4/5 and 3/5, and if the optional 30 kHz waveform is used, additional code bits at rate 4/5 for partitions XU and XL. The forward error corrected data is then assigned to partitions as illustrated by blocks 108, 110, 112, 114, 116 and 118. The numbers on the output arrows of block 106 represent the number of code bits mapped into the partitions for each puncture period.

The partitioned data is then mapped to the interleaver partitions. The data in partitions XU and XL is delayed as shown by blocks 120 and 122 to provide time diversity. The complementary feature of the FEC code is not present with the 20 kHz modes since the code rate is greater than R=1/2. However, the complementary feature is always used for the IBOC Data Service (IDS) subcarriers. The mother code is partitioned into a pair of complementary codes. For example a rate 1/3 code can be partitioned into a pair of good rate 2/3 codes, where each rate 2/3 code is designed to have good similar properties. Conversely if the r=1/3 code is randomly partitioned by an interleaver, then the resulting r=2/3 codes will likely be poor and catastrophic.

Two code rates are provided to allow a tradeoff between higher throughput (FEC rate 4/5 yields 25.8 kbps) or greater coverage (FEC rate 3/5 yields 19.3 kbps). The extended 30 kHz version of the R=4/5 code results in a R=2/5 code after code combining at the receiver to provide all the properties of the CPTCM technique with Lower/Upper/Main/Backup digital diversity. The 20 kHz version of the R=4/5 code provides the Main channel only and employs time diversity with the analog signal. The modulation and interleaving for the two rates are identical, although the information rates and code puncture patterns differ. In the absence of interference issues, a broadcaster would choose the 30 kHz option using the XL and XU partitions yielding coding gain and Backup diversity. However if a first or second adjacent signal would be affected in its coverage area, then that particular XL or XU sideband may be suppressed to avoid interference. A 20 kHz signal would result when both XL and XU are suppressed. Although the 20 kHz signal inflicts much lower interference, its coverage is less.

FIG. 4 is a block diagram illustrating the functionality of an IBOC data service (IDS) channel FEC and interleaving for 20 or 30 kHz AM IBOC system. Data to be transmitted in the data service channel is received as indicated by arrow 130. Block 132 shows that the data is assembled into an IDS block of 80 bits. Block 134 shows that the data in each IDS block is divided into 4-bit groups. Forward error correction encoding and puncturing is then performed as shown in block 136. This produces 12-bit outputs. The forward error corrected data is assigned to the upper and lower IDS subcarriers as illustrated by blocks 138 and 140. The data is then mapped to the IDS interleaver partitions.

The CPTCM technique is applied to Quadrature Amplitude Modulated (QAM) symbols by treating the I and Q components as independently coded Amplitude Shift Keying (ASK) signals. Specifically the 16-QAM symbol is created by modulating the I or Q component with independent 4-ASK signals. The 4-ASK symbols are generated from specially selected 2-bit groups which are then used to address the Gray-mapped constellation points. The mapping of the code bit pairs to the 4 levels of the 4-ASK symbols is presented in Table 1. The Quadrature Phase Shift Keying (QPSK) modulation is conventional assuming Binary Phase Shift Keying (BPSK) in each of the two dimensions.

TABLE 1

Mapping of CPTCM-coded bits to 4 levels of the 4-ASK symbols (for each 16-QAM dimension).

| MAPPING | Level −1.5 | Level −0.5 | Level +0.5 | Level +1.5 |
|---|---|---|---|---|
| A = MSB | 0 | 0 | 1 | 1 |
| B = LSB | 0 | 1 | 1 | 0 |

A/B indicate MSB/LSB only, and are not Partitions

The FEC code and interleaver are designed for CPTCM with a nominal 25 or 19 kbps single stream audio codec. The interleaved symbols are mapped onto a group of 30 QPSK complementary subcarrier pairs in the 0 to ±6 kHz region, 5 16-QAM complementary subcarrier pairs in the 6 to 7 kHz and −6 to −7 kHz regions, and 15 16-QAM noncomplementary subcarriers in each of the 7 to 10 kHz and −7 to −10 kHz regions. An optional 25 subcarriers are transmitted in each of the 10 to 15 kHz and −10 to −15 kHz regions for the optional 30 kHz R=4/5 partitions. The partition code bits that are mapped onto these subcarriers are defined below. The QPSK subcarriers are complementary, meaning that the lower QPSK group is modulated as the mirror image (negative complex conjugate) of the Upper QPSK group. Furthermore, the inner 10 16-QAM subcarriers in the 6 to 7 kHz and −6 to −7 kHz regions are complementary, while the remaining outer 16-QAM subcarriers are independent (noncomplementary). Two additional outer subcarriers located at about ±9.45 kHz are used for IDS information. FIG. 1 illustrates the placement of these subcarriers within the 20 kHz (or optional extended 30 kHz) bandwidth.

The CPTCM code is created through puncturing of a rate 1/3 convolutional code. The FEC code requires appropriate puncture patterns and code-bit mapping to provide good results. The puncture pattern assigns code bits for the groups of subcarrier partitions. The combined puncture patterns for the partitions of the FEC codes for the two rates of the Main Program Audio (MPA) information is defined in Tables 2a and 2b. The subscripts in Tables 2a and 2b represent the code bits in the partition. Subscripts are used because there may be more than one code bit. For example, there is only one B bit, but there are three C bits.

TABLE 2a

Puncture pattern bit assignments for R = 4/5 FEC code (R = 2/5 w/Backup).

| $C_0$ | 0 | $AU_0$ | $XU_3$ | $C_1$ | 0 | $AL_2$ | $XL_3$ |
| $AL_0$ | $XL_1$ | 0 | $AL_1$ | $AU_1$ | $XU_1$ | 0 | $AU_2$ |
| $XL_0$ | B | $XL_2$ | $XL_4$ | $XU_0$ | $C_2$ | $XU_2$ | $XU_4$ |

The FEC 20 kHz Main (A,B,C) Puncture Pattern using convolutional code generator G=[G1=561o, G2=753o, G3=711o] (where o denotes octal notation) has a Hamming free distance of $d_f$=5 and the number of paths at that distance is a=4. The B and C partitions are complementary modulated (not to be confused with complementary code) meaning that the lower subcarrier is the negative complex conjugate of the corresponding upper subcarrier. Therefore the upper and lower groups of subcarriers are not independent. The 30 kHz Backup (X) Puncture Pattern has $d_f$=5 and a=7. The Composite R=2/5 Puncture Pattern has $d_f$=12 and a=2.

TABLE 2b

Puncture pattern bit assignments for R = 3/5 FEC code.

| $AL_0$ | $AU_0$ | $AL_1$ | $AU_1$ | $AL_2$ | $AU_2$ |
| $C_0$ | B | 0 | $C_1$ | $C_2$ | 0 |
| 0 | 0 | 0 | 0 | 0 | 0 |

The FEC Composite Puncture Pattern using G=[G1=561o, G2=753o, G3=711o] has $d_f$=8 and a=1.

The IDS subcarriers are modulated using 16-QAM symbols. Subcarriers −52 and +52 are the IDS subcarriers. The IDS Sequence is 32 symbols long (symbols 0 through 31) and associated with a block length. Symbols transmitted on subcarriers at locations 11 and 27 are assigned as Training Symbols. The remaining 30 symbols carry 120 code bits of rate 2/3 coded information. Hence each IDS Sequence carries 80 information bits, including an 8-bit CRC. A rate 1/3 code is employed with rate 2/3 complementary components. The combined puncture patterns for the partitions of the FEC codes for the IDS information is defined in Table 3.

TABLE 3

Puncture pattern bit assignments for IDS Lower and Upper subcarriers.

| $L_0$ | $U_4$ | $L_4$ | $U_0$ |
| $L_2$ | $U_3$ | $L_3$ | $U_2$ |
| $U_1$ | $L_1$ | $U_5$ | $L_5$ |

The IDS FEC Composite Puncture Pattern using G=[G1=561o, G2=753o, G3=711o] has $d_f$=17 and a=3. For either the Lower or Upper IDS partition the IDS FEC Puncture Pattern has $d_f$=7 and a=6.

The interleavers for the Single Stream Main Program Audio (MPA) span an entire Modem Frame consisting of 256 COFDM symbols (bauds). The IDS interleavers span one block of 32 COFDM symbols, where there are 8 blocks in a Modem Frame.

The interleaving for the MPA code bits is separated into 6 non-overlapping partitions. The Partition C spans 30 complementary QPSK subcarrier pairs 2 through 31 and −2 through −31. The Partition B spans 5 complementary 16-QAM subcarrier pairs 32 through 36 and −32 through −36. The Partition AU spans 15 non-complementary 16-QAM subcarriers 37 through 51. The Partition AL spans 15 non-complementary QPSK subcarriers −37 through −51. The optional 30 kHz Partition XU spans 25 non-complementary 16-QAM subcarriers 57 through 81. The optional 30 kHz Partition XL spans 25 non-complementary QPSK subcarriers −57 through −81. The IDS is split between two Partitions IDSL and IDSU mapped to subcarriers −52 and +52. The MPA interleaver expressions span the entire Modem Frame of 256 OFDM symbols (Block of 32 symbols for IDS), while the span over the number of subcarriers is dependent on the size of the partition. For example, the code bits are mapped over the subcarriers in a partition, that is, the code bits span the partition.

The MPA interleaving is performed after gathering one Modem Frame of MPA data. The data in one embodiment consists of 38400 bits for the rate 4/5 mode, or 28800 bits for the rate 3/5 mode. The data is then coded, punctured, and grouped into partitions AL, AU, B and C for subsequent interleaving. The partition bits within each puncture pattern are ordered as indicated, then stacked over the multiple puncture patterns comprising the Modem Frame. The ordering of the code bits within each partition ensures that the code bits are mapped to the particular QAM or QPSK symbol bits per the interleaver expressions.

The 80 IDS information bits comprising each Block are coded and assembled in groups of bits from the puncture patterns. The groupings within each partition are mapped using the interleaver expressions presented in Table 4.

In Table 4, the value of n indicates the particular ordered code bit (one of N bits) within each partition. The index k is computed from n, and points to one of the symbol locations within the Modem Frame (or Block for the IDS) identifying the row and column within the partition. Each of the 16-QAM symbols carries 4 code bits, while each QPSK symbol carries 2 bits. The value of p in the interleaver expression indicates the particular bit within each symbol (i.e., I or Q, and MSB or LSB where applicable).

TABLE 4

Interleaver Mapping for all Partitions.

| Partition | Index k | Row & column locations for symbol k | P code bit in symbol |
|---|---|---|---|
| $AU_{k,p}$<br>N = 14400 | k = mod[n + floor(n/3600), 3600]<br>n = 0 ... N − 1 | $rowA(k) = \mod\left(5 + 109 \cdot k + 11 \cdot \text{floor}\left(\frac{7 \cdot k}{15}\right) + 111 \cdot \text{floor}\left(\frac{k}{240}\right), 256\right)$<br>colA(k) = mod(7·k, 15); k = 0 ... 3599,<br>Training symbols at locations k = 3600 ... 3839 | p = mod(n, 4) |
| $AL_{k,p}$<br>N = 14400 | k = mod[n + floor(n/3600), 3600]<br>n = 0 ... N − 1 | $rowA(k) = \mod\left(5 + 109 \cdot k + 11 \cdot \text{floor}\left(\frac{7 \cdot k}{15}\right) + 111 \cdot \text{floor}\left(\frac{k}{240}\right), 256\right)$<br>colA(k) = mod(7·k, 15); k = 0 ... 3599,<br>Training symbols at locations k = 3600 ... 3839 | p = mod(n, 4) |
| $B_{k,p}$<br>N = 4800 | k = mod[n + floor(n/1200), 1200]<br>n = 0 ... N − 1 | $rowB(k) = \mod\left(14 + 102 \cdot k + 25 \cdot \text{floor}\left(\frac{2 \cdot k}{5}\right) + 111 \cdot \text{floor}\left(\frac{k}{80}\right), 256\right)$<br>colB(k) = mod(2·k, 5); k = 0 ... 1199,<br>Training symbols at locations k = 1200 ... 1279 | p = mod(n, 4) |
| $C_{k,p}$<br>N = 14400 | k = mod[n + floor(n/7200), 7200]<br>n = 0 ... N − 1 | $rowC(k) = \mod\left(4 + 97 \cdot k + 6 \cdot \text{floor}\left(\frac{19 \cdot k}{30}\right) + 111 \cdot \text{floor}\left(\frac{k}{480}\right), 256\right)$<br>colC(k) = mod(19·k, 30); k = 0 ... 7199,<br>Training symbols at locations k = 7200 ... 7679 | p = mod(n, 2) |
| $IDSU_{k,p}$<br>N = 120 | k = mod[n + floor(n/60), 30]<br>n = 0 ... N − 1 | rowIDS(k) = mod(5 + 9·k, 32)<br>colIDS(k) = 0; k = 0 ... 29,<br>Training symbols at locations 11 and 27 | p = mod(n, 4) |
| $IDSL_{k,p}$<br>N = 120 | k = mod[n + floor(n/60), 30]<br>n = 0 ... N − 1 | rowIDS(k) = mod(5 + 9·k, 32)<br>colIDS(k) = 0; k = 0 ... 29,<br>Training symbols at locations 11 and 27 | p = mod(n, 4) |
| $XU_{k,p}$<br>optional<br>N = 24000 | k = mod[n + floor(n/6000), 6000]<br>n = 0 ... N − 1 | $rowA(k) = \mod\left(1 + 99 \cdot k + 29 \cdot \text{floor}\left(\frac{9 \cdot k}{25}\right) + 111 \cdot \text{floor}\left(\frac{k}{400}\right), 256\right)$<br>colA(k) = mod(9·k, 25); k = 0 ... 5999,<br>Training symbols at locations k = 6000 ... 6399 | p = mod(n, 4) |
| $XL_{k,p}$<br>optional<br>N = 24000 | k = mod[n + floor(n/6000), 6000]<br>n = 0 ... N − 1 | $rowA(k) = \mod\left(1 + 99 \cdot k + 29 \cdot \text{floor}\left(\frac{9 \cdot k}{25}\right) + 111 \cdot \text{floor}\left(\frac{k}{400}\right), 256\right)$<br>colA(k) = mod(9·k, 25); k = 0 ... 5999,<br>Training symbols at locations k = 6000 ... 6399 | p = mod(n, 4) |

The Interleaver Indices are: k=Modem Frame Symbol Index for MPA Partitions, or Block Symbol Index for IDS Partitions; and p=16-QAM code bit mapping within each 16-QAM symbol, (IMSB=0, ILSB=1, QMSB=2, QLSB=3), or QPSK code bit mapping within each QPSK symbol, (I=0, Q=1), where I/Q=In phase/Quadrature, MSB or LSB of Gray-coded 4ASK symbols.

Figure 5:
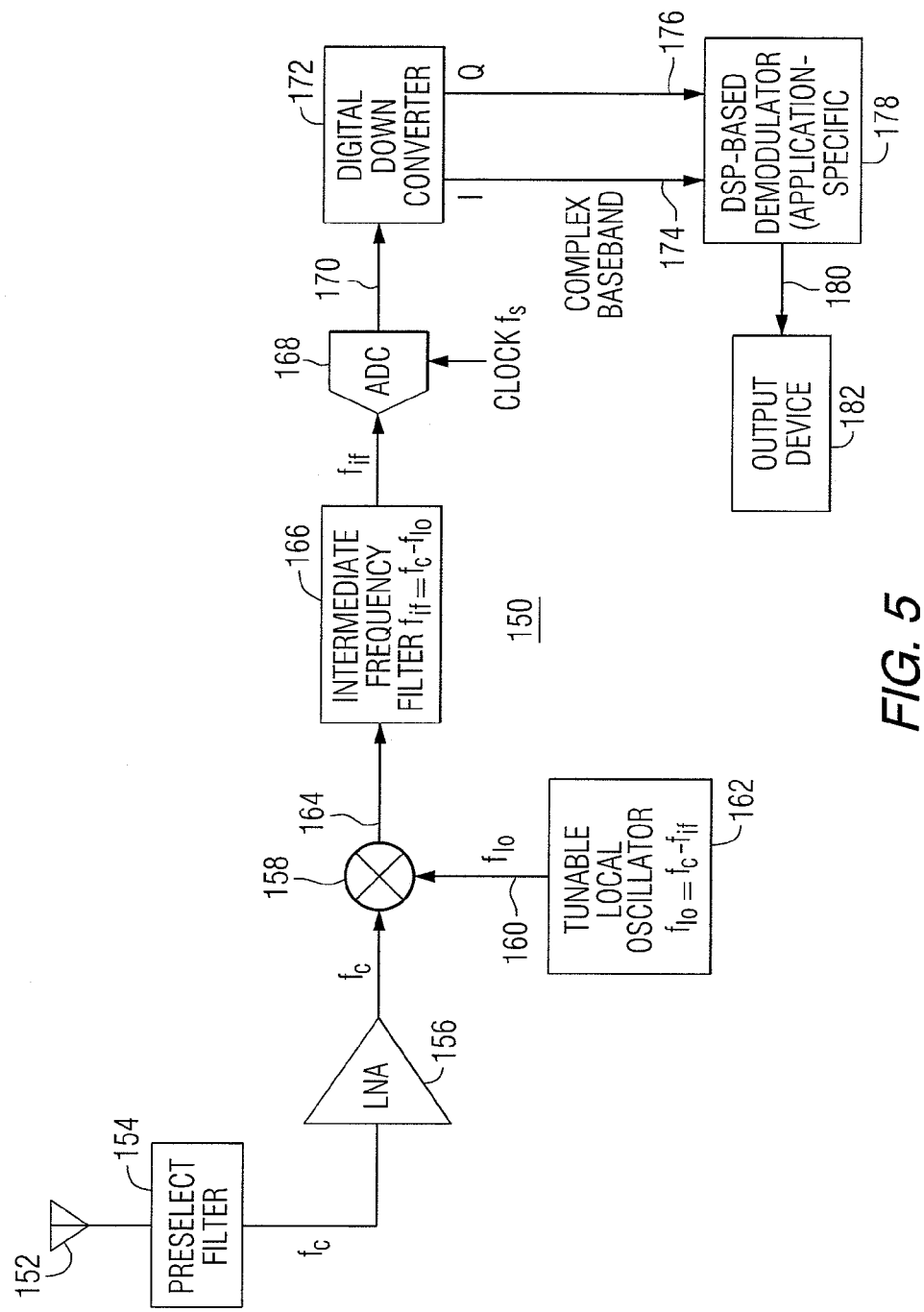
FIG. 5 is a functional block diagram of an AM IBOC DAB receiver constructed in accordance with this invention.

FIG. 5 is a block diagram of a radio receiver 150 constructed in accordance with this invention. The DAB signal is received on antenna 152. A bandpass preselect filter 154 passes the frequency band of interest, including the desired signal at frequency $f_c$, but rejects the image signal at $(f_c-2f_{if})$, for a low side lobe injection local oscillator. Low noise amplifier 156 amplifies the signal. The amplified signal is mixed in mixer 158 with a local oscillator signal $f_{lo}$ supplied on line 160 by a tunable local oscillator 162. This creates sum $(f_c+f_{lo})$ and difference $(f_c-f_{lo})$ signals on line 164. Intermediate frequency filter 166 passes the intermediate frequency signal $f_{if}$ and attenuates frequencies outside of the bandwidth of the modulated signal of interest. An analog-to-digital converter 168 operates using a clock signal $f_s$ to produce digital samples on line 170 at a rate $f_s$. Digital down converter 172 frequency shifts, filters and decimates the signal to produce lower sample rate in-phase and quadrature signals on lines 174 and 176. A digital signal processor based demodulator 178 then provides additional signal processing to produce an output signal on line 180 for output device 182.

A functional block diagram of the deinterleaver 190 and FEC decoder portions of a receiver are shown in FIGS. 6 and 7. The constellation data at the input on line 192 includes the I and Q values for each of the QAM or QPSK symbols, which have been demodulated and normalized to the constellation grid. Channel State Information (CSI) is associated with each I and Q value to permit subsequent soft-decision detection of the code bits. The Partitions AU, AL, B and C (and optionally XU and XL) are accumulated in an entire Modem Frame prior to deinterleaving, as shown in block 194. The deinterleaving and depuncturing are the reverse of operations performed in the transmitter. Block 196 shows that soft decision code bits are produced for the signals transmitted in the central ±20 kHz band and for the extended upper and lower sidebands if used. The various partitions are deinterleaved as shown in blocks 198, 200, 202, 204, 206 and 208. The deinterleaved bits for partitions AU, AL, B and C are delayed as shown in blocks 210, 212, 214 and 216. FEC decoding of the main program audio is then performed as shown in block 218 to produce MPA packets on line 220.

FIG. 7 is a block diagram of the IDS decoding. The IDS signal is input on line 222 and the assembled constellation data and channel state information are assembled as shown in block 224. Soft decisions are generated as shown in block 226, which are subsequently deinterleaved as shown in block 228. The resulting IDSL and IDSU signals are then FEC decoded as illustrated by block 230 to produce IDS packets on line 232. The IDS functions are processed on interleaver Block boundaries (as opposed to Modem Frame boundaries) in order to minimize delay in processing the IDS data.

Since binary codes are used for CPTCM, it is necessary to obtain soft binary metrics from noisy M-ary symbols. Suppose that the received noise symbol is:

$$y_i = s_i + n_i, i=1, \ldots N.$$

Assuming K information bits per symbol, the binary metric for the k-th bit is given by:

$$\lambda_{i,k} = \ln\frac{Pr(b_k=1|y_i)}{Pr(b_k=0|y_i)} = \ln\frac{\sum_{all\ s_j^{1,k}} f_n(y_i - s_j^{1,k})}{\sum_{all\ s_j^{0,k}} f_n(y_i - s_j^{0,k})}, k=1,\ldots,K$$

where $s_j^{1,k}$ stands for the j-th symbol in the constellation that has bit value 1 in the k-th bit position (and similarly for $s_j^{0,k}$, the j-th symbol in the constellation that has bit value 0 in the k-th bit), and $$f_n(x) = \frac{1}{\sqrt{2\pi\sigma^2}} \exp\left[-\frac{x^2}{2\sigma^2}\right]$$

is the probability density function of noise, assuming AWG noise. The above formula for the soft bit metric applies for any constellation. The main disadvantage of this approach is that it requires computations of exponentials. An approximate metric can be obtained by approximating the sum of exponentials by the maximum exponential, so that:

$$\lambda_{i,k} \cong \ln\frac{\max_{all\ s_j^{1,k}} \exp\left[-\frac{1}{2\sigma_i^2}(y_i - s_j^{1,k})^2\right]}{\max_{all\ s_j^{0,k}} \exp\left[-\frac{1}{2\sigma_i^2}(y_i - s_j^{0,k})^2\right]}, k=1,\ldots,K$$

$$\cong \frac{1}{\sigma_i^2}\left[y_i(s_{min}^{1,k} - s_{min}^{0,k}) - 0.5(s_{min2}^{1,k} - s_{min2}^{0,k})\right]$$

where irrelevant terms and constants are dropped and $s_{min}^{1,k}$ denotes the symbol closest to $y_i$ that has 1 in the k-th bit position (and similarly for $s_{min}^{0,k}$). Thus, by means of this approximation (the so called log-max approximation) the calculation of exponentials is avoided. However a fraction of dB can be lost in performance as a consequence of using this approximation.

Figure 8:
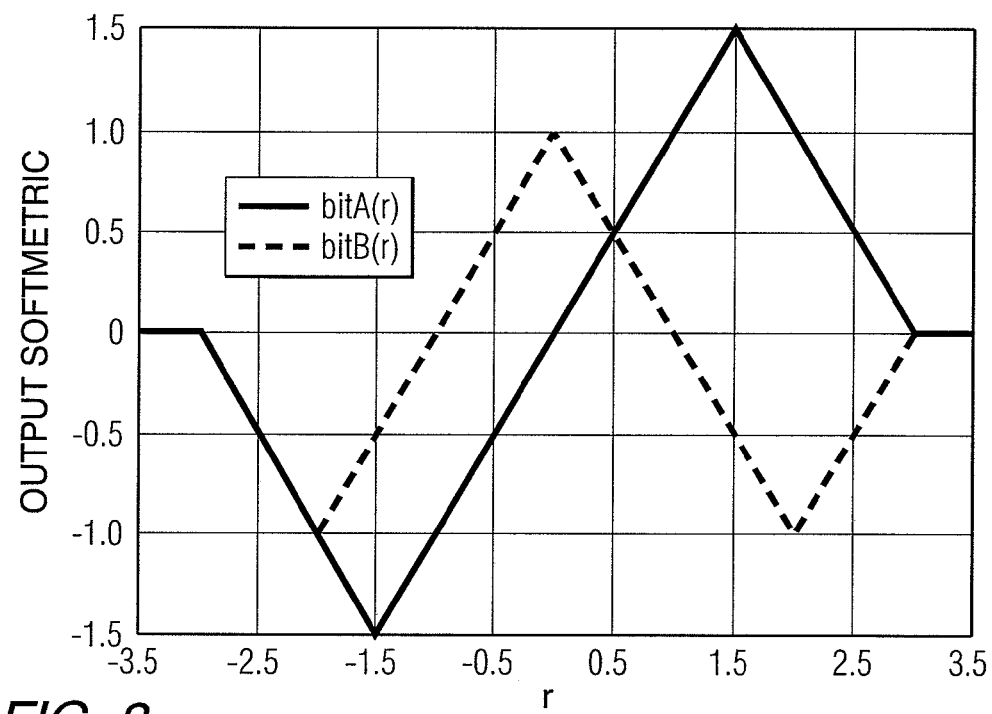
FIG. 8 is a diagram of a robust soft metric F(y) for 4-ASK (I or Q component of 16-QAM).
Figure 9:
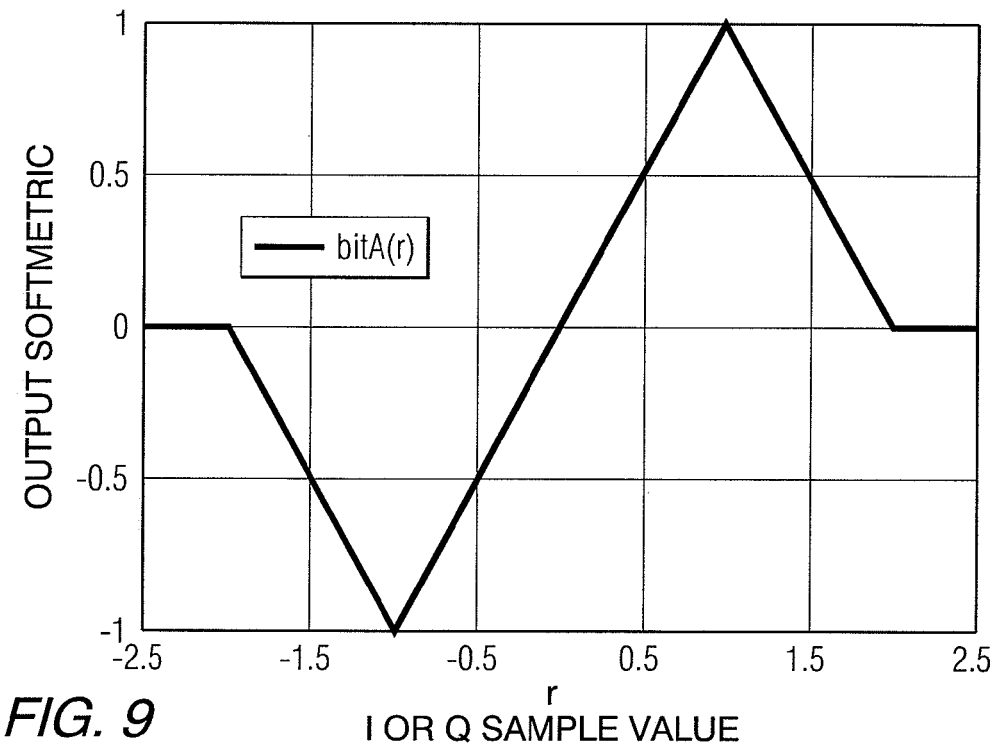
FIG. 9 is a diagram of a robust soft metric F(y) for BPSK (I or Q component of QPSK).

Next, consider possible improvements of soft metric for the impulsive noise scenario. Assume that the noisy symbol sample is passed through a nonlinearity in the form of a soft limiter or linear clipper. It is desired to construct a soft metric that performs approximately the same in Average White Gaussian Noise (AWGN) as previously considered metrics, yet that will have smaller degradation in impulsive noise. That is, it has to have enough "softness" to maximize the performance in AWGN and to limit metric samples when impulsive noise is present, i.e. to prevent the excessive metric growth when large noise samples are present. FIGS. 8 and 9 illustrate nonlinearities for 4-ASK and QPSK, respectively.

Based on the value of received noisy signal, soft metrics can be constructed by passing the received sample through different nonlinearities shown in FIGS. 8 and 9. The constructed soft bit values are further divided by the corresponding values of average noise power estimated for the symbol. In summary, the soft metric can be represented by:

$$\text{soft\_out}_i = \frac{F(y_i)}{\sigma_i^2}$$

where y represents the received noisy symbol and F(.) is the desired nonlinearity from FIGS. 8 and 9.

The performance of surviving partitions under various interference scenarios is set forth in Table 5.

TABLE 5

Performance of surviving partitions with interference

| PARTITIONS (surviving) | Hamming Free Distance error-correcting property | Scenario |
|---|---|---|
| AL + AU + B + C + XL + XU (full 30 kHz option XL + XU) | 12 | All partitions (30 kHz) Full time diversity No large interferers |
| AL + AU + B + C + XL (full 25 kHz optional XL) | 8 | Eliminate XU |
| AL + AU + B + C + XU (full 25 kHz optional XU) | 8 | Eliminate XL |
| AL + AU + B + C (full 20 kHz option) | 5 | Main, Or corrupted Backup XL, XU |
| AL + AU + XL + XU | 9 | Co-channel Interferer B & C corrupted |
| XL + XU | 5 | Backup time diverse, main corrupted |
| AU + B + C + XU | 6 | Lower + center (B + C) AL, XL corrupted, Moderate Lower First adjacent interferer |
| AL + B + C + XL | 6 | Upper + center (B + C) AU, XU corrupted, Moderate Upper First adjacent interferer |
| AU + B + XU | 4 | Large Lower first adjacent interferer, or Lower second with XU |
| AL + B + XL | 3 | Large Upper first adjacent interferer, or Upper second with XL |
| AU + XU | 1 | Co-channel and Lower first and second adjacent interferers |
| AL + XL | 1 | Co-channel and Upper first and second adjacent interferers |

The bits in the AU, AL, and the XU and XL partitions are true complementary pairs, whereas the B and C partitions are extra code bits to improve coding gain. True complementary implies that one partition (e.g., AU) is a cyclic shift of the code bits of another partition (e.g., AL), and that these partitions (component codes) are good noncatastrophic codes by themselves having identical code properties. When the complementary partitions are combined, they form a code that is generally better than the sum of the two. In the method of this invention, the restriction that these codes be a cyclic shift of each other with identical properties is not necessary.

This invention reduces adjacent channel interference relative to the previous AM Hybrid system. It also introduces lower crosstalk to its analog AM host signal since the C partition spans about ±6 kHz at −50 dBc/subcarrier, whereas previous design spans ±5 kHz and the 5 to 6 kHz range is −43 dBc/subcarrier. In other words it is more compatible in the AM environment.

An important feature of this code is the flexibility of the design such that either of the optional XU or XL partitions can be eliminated or suppressed to reduce adjacent channel interference. When one partition is eliminated (e.g., XU), then the signal occupies approximately 25 kHz. When both are eliminated the BW is 20 kHz. This is an important flexibility feature of the code to accommodate the adjacent channel assignments for a particular AM station. These features are preferred over creating new code designs for 20, 25 and 30 kHz options. Another feature of this signal is that the outer partitions XU and XL (when present) are reduced by 10 dB in power relative to the previous Hybrid design. The B and C partitions are extra partitions in addition to the complementary partitions which provide additional coding gain in some interference scenarios.

9 kHz or 10 kHz Channel-Spacing Systems

In another aspect, this invention provides a modified version of the CPTCM method of forward error correction (FEC) for application to the AM signal. The method is based upon a combination of a new code pattern-mapping technique, and the application of Complementary Punctured Codes to an IBOC system, expanding the complementary-like properties to multiple dimensions. The coding and interleaving technique is designed to be flexible for operation with either 10 kHz or 9 kHz spaced channels in various regions around the world. Furthermore, the outer subcarriers may be reduced in power, or eliminated to mitigate the effects of some interference scenarios.

The code bits to be transmitted are divided into five partitions including a main upper (MU) partition, a main lower (ML) partition, a backup upper (BU) partition, a backup lower (BL) partition, and a tertiary (T) partition. The addition of a fifth partition (i.e., the tertiary partition T) further improves robustness of the code. The fifth partition (T) is an extra partition in addition to the original four overlapping partitions (MU, ML, BU, BL) as defined in the original CPTCM code design description. This fifth partition provides additional error correction code bits, improving robustness especially in the presence of interferers. The fifth partition does not overlap any of the other partitions, but can be combined with any of the other partitions in many interference scenarios to improve robustness.

This new mode carries audio in a single stream. The terms primary, secondary, and tertiary used in the following description identify the partition regions. BU and BL identify the primary partitions, MU and ML identify secondary partitions, and T identifies the newly defined tertiary partition.

A particular mode of operation is described below for a single stream (e.g., 24 kilobits per second (kbps)) of digital audio with reduced power in the primary subcarriers (i.e., those subcarriers spaced 10 to 15 kHz on either side from the main carrier).

A combination of reduced power and CPTCM coding with the additional code partition is designed to reduce interference with minimal loss of digital coverage.

Figure 10:
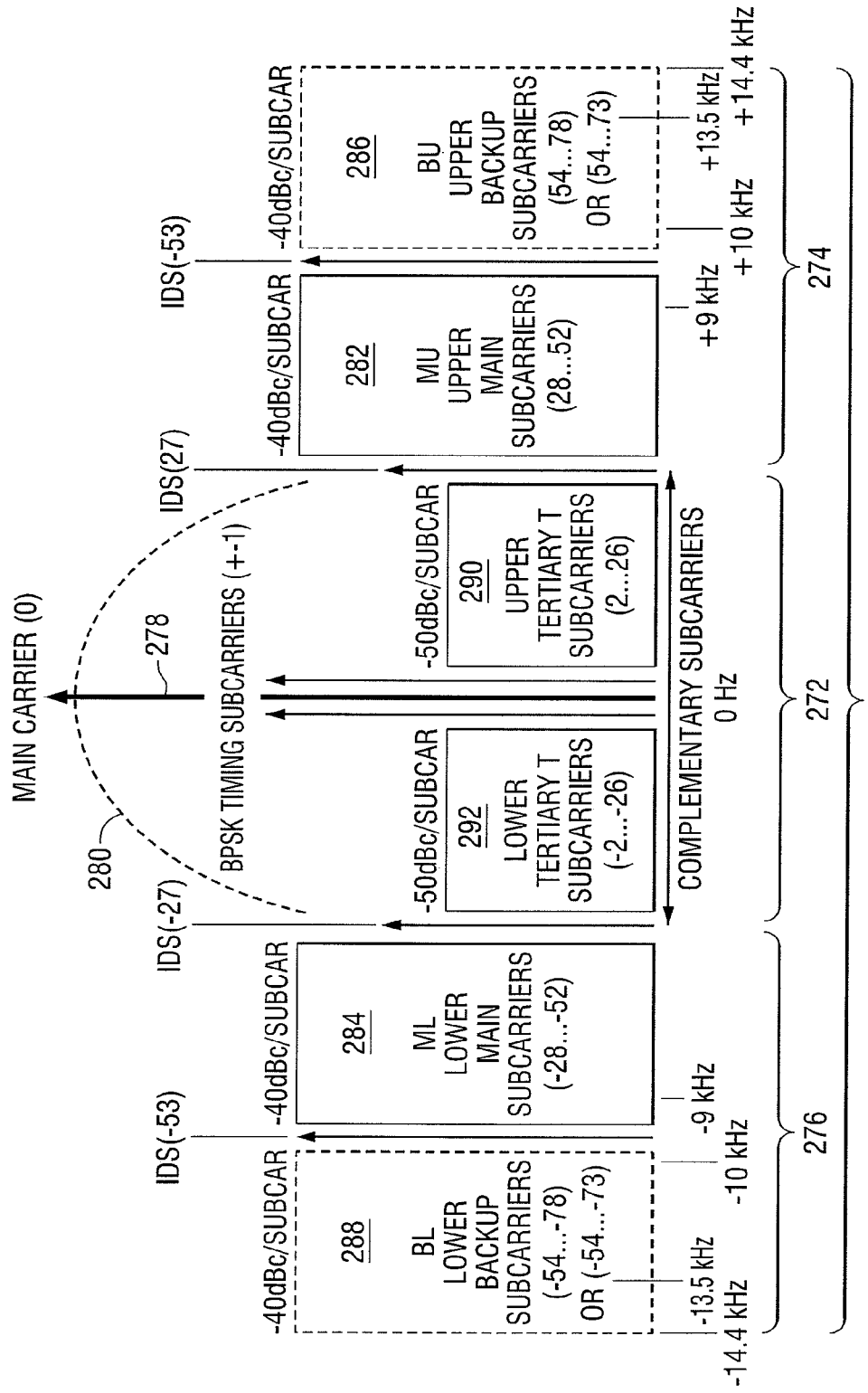
FIG. 10 is a schematic representation of the subcarrier assignments for an AM hybrid in-band on-channel digital audio broadcasting system compatible with 9 kHz channel spacing.

FIG. 10 is a schematic representation of the subcarrier assignments for an AM hybrid in-band on-channel digital audio broadcasting signal compatible with 9 kHz channel spacing. FIG. 10 shows the subcarrier assignments in a channel 270 that encompasses a center frequency band 272, an upper sideband 274, and a lower sideband 276. A main carrier 278 is positioned at the center of the channel, and analog amplitude modulated to produce an analog modulated signal 280 in the center frequency band. A plurality of subcarriers are positioned in the channel at evenly spaced frequencies. The positions of the subcarriers at frequencies above the center frequency are designated as subcarrier positions +1 through +78 (or optionally +1 through +73 for the 9 kHz channel spacing mode). The positions of the subcarriers at frequencies below the center frequency are designated as subcarrier positions −1 through −78 (or optionally −1 through −73). The subcarriers at positions +1 and −1 are BPSK modulated timing subcarriers. The subcarriers at positions +27, +53, −27 and −53 are used to transmit IDS information.

The remaining subcarriers are grouped into partitions including: primary or main upper subcarriers 282 at positions +28 through +52; primary or main lower subcarriers 284 at positions −28 through −52; secondary or backup upper subcarriers 286 at positions +54 through +78 (or optionally +54 through +73); secondary or backup lower subcarriers 288 at positions −54 through −78 (or optionally −54 through −73); upper tertiary subcarriers 290 at positions +2 through +26; lower tertiary subcarriers 292 at positions −2 through −26.

In one embodiment for the 9 kHz channel spacing mode, the power spectral density of each subcarrier in the main upper (subcarriers 28 through 52) and main lower sidebands (subcarriers −28 through −52) is at least 40 dBc below the power spectral density of the main carrier. The power spectral density of each subcarrier in the backup upper (subcarriers 54 through 78 (or 73)) and backup lower sidebands (subcarriers −54 through −78 (or 73)) is at least 40 dBc below the power spectral density of the main carrier. The power spectral density of each subcarrier located at positions 2 through 26 and −2 through −26 is at least 50 dBc below the power spectral density of the main carrier. The subcarriers at positions +1 and −1 are BPSK timing subcarriers. The subcarriers at positions +27, +53, −27 and −53 are used to transmit IDS information.

Figure 11:
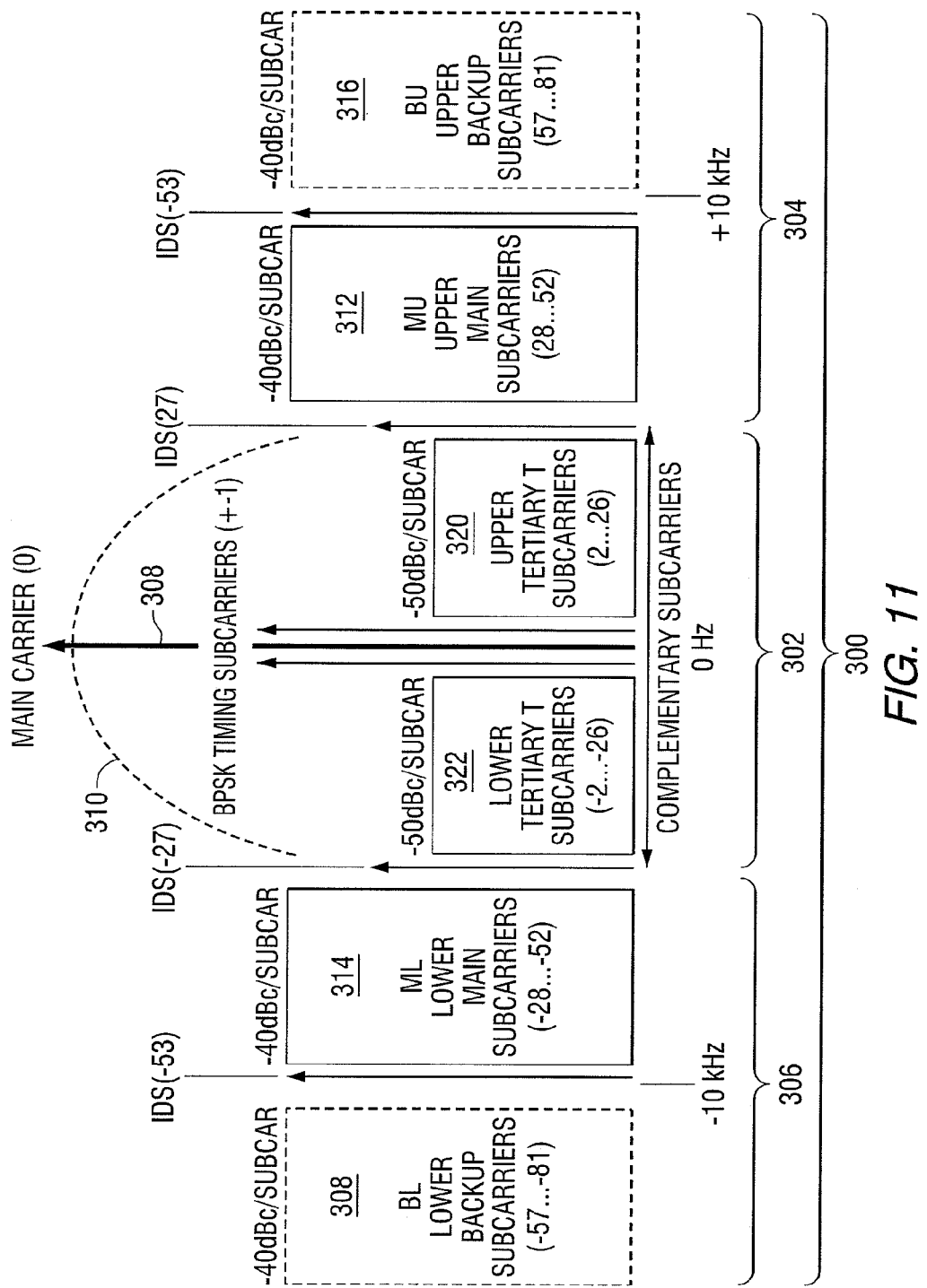
FIG. 11 is a schematic representation of the subcarrier assignments for an AM hybrid in-band on-channel digital audio broadcasting system compatible with 10 kHz channel spacing.

FIG. 11 is a schematic representation of the subcarrier assignments for an AM hybrid in-band on-channel digital audio broadcasting signal compatible with 10 kHz channel spacing. This 10 kHz channel spacing mode differs from the 9 kHz channel spacing mode in the location of the backup outer partitions. This 10 kHz channel spacing mode shifts these outer backup partitions by 3 subcarrier locations (relative to the 9 kHz mode) to better accommodate main carrier interference with a 10 kHz first adjacent interferer. FIG. 11 shows the subcarrier assignments in a channel 300 that encompasses a center frequency band 302, an upper sideband 304, and a lower sideband 306. A main carrier 308 is positioned at the center of the channel, and analog amplitude modulated to produce an analog modulated signal 310 in the center frequency band. A plurality of subcarriers are positioned in the channel at evenly spaced frequencies. The positions of the subcarriers at frequencies above the center frequency are designated as subcarrier positions +1 through +81. The positions of the subcarriers at frequencies below the center frequency are designated as subcarrier positions −1 through −81. The subcarriers at positions +1 and −1 are BPSK timing subcarriers. The subcarriers at positions +27, +53, −27 and −53 are used to transmit IDS information.

The remaining subcarriers are grouped into: primary or main upper subcarriers 312 at positions +28 through +52; primary or main lower subcarriers 314 at positions −28 through −52; secondary or backup upper subcarriers 316 at positions +54 through +81; secondary or backup lower subcarriers 318 at positions −54 through −81; upper tertiary subcarriers 320 at positions +2 through +26; lower tertiary subcarriers 322 at positions −2 through −26.

In one embodiment, the power spectral density of each subcarrier in the upper and lower sidebands is at least 40 dBc below the power spectral density of the main carrier. The power spectral density of each subcarrier located at positions 2 through 26 and −2 through −26 is at least 50 dBc below the power spectral density of the main carrier.

Digital information is transmitted on the primary and secondary (main and backup) subcarriers using quadrature amplitude modulation (QAM), and on the tertiary subcarriers using quadrature phase shift keying (QPSK). The digital information is forward error corrected and interleaved prior to modulation. The interleaving, FEC coding, and modulation aspects of the invention are described below. A comparison of the relative performance of a signal broadcast in accordance with an aspect of the invention with respect to a prior hybrid mode is presented below.

The CPTCM technique is applied to a QAM symbol by treating the I and Q components as independently coded and modulated ASK signals. Specifically, a 16-QAM symbol is created by modulating the I and Q components with independent 4-ASK signals. The 4-ASK symbols are generated from specially selected 2-bit groups which are then used to address the Gray-mapped constellation points. In one example, the mapping of the code-bit pairs to the four levels of the 4-ASK symbols is presented in Table 6.

TABLE 6

Mapping of CPTCM-coded bits to four levels of the 4-ASK symbols.

| MAPPING | Level −1.5 | Level −0.5 | Level +0.5 | Level +1.5 |
|---|---|---|---|---|
| A = MSB | 0 | 0 | 1 | 1 |
| B = LSB | 0 | 1 | 1 | 0 |

The interleaver in one example is designed for CPTCM with a nominal 24 kbps single stream audio codec. The interleaver is comprised of 6 groups of 25 subcarriers each. The 6 groups include the primary, secondary, and tertiary groups, each having an upper and lower partition as shown in FIGS. 10 and 11. All subcarriers in the primary and secondary groups are modulated with 16-QAM symbols. The code bits that modulate the symbols are defined in the interleaver description below.

The tertiary subcarriers are modulated with QPSK symbols. The upper and lower tertiary groups are described as complementary, meaning that the lower tertiary group is modulated with the same code bits as the mirror image (negative complex conjugate) of the upper tertiary group. Two additional subcarrier pairs (at subcarrier locations ±27 and ±53) are used for integrated digital services (IDS) information, and are coded separately. The analog AM signal must be limited to less than ±5 kHz since the secondary partitions are not complementary.

The CPTCM code can be created through puncturing and partitioning of a rate-1/3 convolutional FEC code. The FEC code requires appropriate puncture patterns and code-bit mapping to provide good results. The puncture pattern assigns code bits to the groups of subcarrier partitions. The combined puncture patterns for the partitions of the FEC code for one example are defined in Tables 7 and 8. Table 7 shows the puncture pattern bit mapping to the main (M), backup (B), and tertiary (T) partitions. The main and backup partitions are further separated into A and B groups representing the most significant bit (MSB) and least significant bit (LSB) Gray-code mapping, respectively, in each I or Q 16-QAM symbol dimension. The tertiary partition uses conventional QPSK, so there are I and Q bits, but no A or B designation. For example, the bit ordering for the first 4 bits (n=0 . . . 3) of the MU interleaver would be $MU_{IA}$, $MU_{IB}$, $MU_{QA}$, and $MU_{QB}$. The ordering and interleaver details are further described below.

TABLE 7

Puncture Pattern code bit assignments for R = 1/3 FEC code, with G = [G1 = 561o, G2 = 657o, G3 = 711o].

| | Data bit 0 | Data bit 1 | Data bit 2 | Data bit 3 | Data bit 4 | Data bit 5 |
|---|---|---|---|---|---|---|
| G1 | $BU_{IB}$ | $MU_{IA}$ | $ML_{IA}$ | $BU_{QB}$ | $MU_{QA}$ | $ML_{QA}$ |
| G2 | $BL_{IB}$ | $T_I$ | $MU_{IB}$ | $BL_{QB}$ | $T_Q$ | $MU_{QB}$ |
| G3 | $ML_{IB}$ | $BL_{IA}$ | $BU_{IA}$ | $ML_{QB}$ | $BL_{QA}$ | $BU_{QA}$ |

TABLE 8

Performance metrics for code partitions, including rate, Hamming distance $d_{free}$, and number of paths (a).

| Metric | COMP | M + T | B + T | M | B | L + T | U + T | L | U |
|---|---|---|---|---|---|---|---|---|---|
| Rate | 1/3 | 3/5 | 3/5 | 3/4 | 3/4 | 3/5 | 3/5 | 3/4 | 3/4 |
| $d_{free}$ | 17 | 8 | 7 | 6 | 5 | 7 | 6 | 5 | 5 |
| a | 12 | 10 | 1 | 15 | 1 | 3 | 1 | 2 | 2 |

The number of paths (a) represents the number of paths through the convolutional coding trellis that are at a Hamming distance $d_{free}$ away from the correct path. Punctured codes with larger $d_{free}$ values have better performance than smaller values of $d_{free}$, while punctured codes with the same $d_{free}$ value are better with a smaller number of paths (a).

The IDS subcarriers are modulated using 16-QAM symbols. Subcarriers at locations 27, 53, −27 and −53 are IDS subcarriers in the hybrid system. Subcarriers at locations −27 and −53 are complementary to the subcarriers at locations 27 and 53. In one example, the IDS sequence is 32 symbols long (symbols 0 through 31) and associated with a block length. Symbol locations 10 and 26 are assigned training symbols. The remaining 30 symbols carry 120 bits of rate-2/3 coded information. Hence, each IDS sequence carries 80 information bits, including an 8-bit cyclic redundancy check (CRC). A rate-1/3 code is employed with rate-2/3 complementary components. The upper and lower complementary code components of the all-digital IDS subcarriers correspond to the hybrid inner and outer IDS complementary subcarrier pairs, respectively.

TABLE 9

Puncture pattern bit assignments for IDS, with G = [G1 = 561o, G2 = 753o, G3 = 711o].

| | Data bit 0 | Data bit 1 | Data bit 2 | Data bit 3 | Data bit 4 | Data bit 5 | Data bit 6 | Data bit 7 |
|---|---|---|---|---|---|---|---|---|
| G1 | $IDSL_{IA0}$ | $IDSU_{IA1}$ | $IDSL_{IA1}$ | $IDSU_{IA2}$ | $IDSL_{QA0}$ | $IDSU_{QA1}$ | $IDSL_{QA1}$ | $IDSU_{QA2}$ |
| G2 | $IDSL_{IB0}$ | $IDSU_{IB0}$ | $IDSL_{IB2}$ | $IDSU_{IB2}$ | $IDSL_{QB0}$ | $IDSU_{QB0}$ | $IDSL_{QB2}$ | $IDSU_{QB2}$ |
| G3 | $IDSU_{IA0}$ | $IDSL_{IB1}$ | $IDSU_{IB1}$ | $IDSL_{IA2}$ | $IDSU_{QA0}$ | $IDSL_{QB1}$ | $IDSU_{QB1}$ | $IDSL_{QA2}$ |

TABLE 10

IDS FEC summary of parameters.

| Metric | COMP | Upper | Lower |
|---|---|---|---|
| Rate | 1/3 | 2/3 | 2/3 |
| dfree | 17 | 7 | 7 |
| a | 3 | 3 | 3 |

In one example, the interleaver blocks consist of 32 COFDM symbols (bauds). There are 8 blocks in a modem frame. The backup partition is interleaved over only 1 block span to permit rapid digital tuning. Each block holds a total of 800 QAM symbols (750 data+50 training).

Interleaving within each block spanning 25 subcarriers and 32 OFDM symbols is performed using the following expressions for the row and column indices:

$$\text{row}(k) = \text{mod}\left[11 \cdot \text{mod}(9 \cdot k, 25) + 16 \cdot \text{floor}\left(\frac{k}{25}\right) + 11 \cdot \text{floor}\left(\frac{k}{50}\right), 32\right]$$

$$\text{col}(k) = \text{mod}[9 \cdot k, 25]$$

$$k = 0 \ldots 749.$$

The index k points to one of the 750 QAM symbols within the block. Each of the 16-QAM symbols carries 4 code bits, which are mapped to the 16 QAM constellation within a block. Of the total of 800 symbols in a block, the remaining 50 QAM symbols are used for training symbols. The training symbols are located in the last 50 QAM symbol locations. The row and columns are indexed using the last 50 values of k. In this example, the training symbol locations are: k=750 . . . 799.

TABLE 11

Symbol indices within a Block, with Training Symbol = "T".

|  |  | 0 | 1 | 2 | 3 | 4 | 5 | 6 | 7 | 8 | 9 | 10 | 11 | 12 |
|---|---|---|---|---|---|---|---|---|---|---|---|---|---|---|
| A = | 0 | 0 | "T" | 728 | 692 | 631 | 595 | 534 | 498 | 437 | 376 | 340 | 279 | 243 |
|  | 1 | 150 | 114 | 53 | 17 | "T" | 745 | 684 | 648 | 587 | 526 | 490 | 429 | 393 |
|  | 2 | 300 | 264 | 203 | 167 | 106 | 70 | 9 | "T" | 737 | 676 | 640 | 579 | 543 |
|  | 3 | 450 | 414 | 353 | 317 | 256 | 220 | 159 | 123 | 62 | 1 | "T" | 729 | 693 |
|  | 4 | 600 | 564 | 503 | 467 | 406 | 370 | 309 | 273 | 212 | 151 | 115 | 54 | 18 |
|  | 5 | "T" | 714 | 653 | 617 | 556 | 520 | 459 | 423 | 362 | 301 | 265 | 204 | 168 |
|  | 6 | 125 | 89 | 28 | "T" | 706 | 670 | 609 | 573 | 512 | 451 | 415 | 354 | 318 |
|  | 7 | 275 | 239 | 178 | 142 | 81 | 45 | "T" | 723 | 662 | 601 | 565 | 504 | 468 |
|  | 8 | 425 | 389 | 328 | 292 | 231 | 195 | 134 | 98 | 37 | "T" | 715 | 654 | 618 |
|  | 9 | 575 | 539 | 478 | 442 | 381 | 345 | 284 | 248 | 187 | 126 | 90 | 29 | "T" |
|  | 10 | 725 | 689 | 628 | 592 | 531 | 495 | 434 | 398 | 337 | 276 | 240 | 179 | 143 |
|  | 11 | 50 | 14 | "T" | 742 | 681 | 645 | 584 | 548 | 487 | 426 | 390 | 329 | 293 |
|  | 12 | 200 | 164 | 103 | 67 | 6 | "T" | 734 | 698 | 637 | 576 | 540 | 479 | 443 |
|  | 13 | 350 | 314 | 253 | 217 | 156 | 120 | 59 | 23 | "T" | 726 | 690 | 629 | 593 |
|  | 14 | 500 | 464 | 403 | 367 | 306 | 270 | 209 | 173 | 112 | 51 | 15 | "T" | 743 |
|  | 15 | 650 | 614 | 553 | 517 | 456 | 420 | 359 | 323 | 262 | 201 | 165 | 104 | 68 |
|  | 16 | 25 | "T" | 703 | 667 | 606 | 570 | 509 | 473 | 412 | 351 | 315 | 254 | 218 |
|  | 17 | 175 | 139 | 78 | 42 | "T" | 720 | 659 | 623 | 562 | 501 | 465 | 404 | 368 |
|  | 18 | 325 | 289 | 228 | 192 | 131 | 95 | 34 | "T" | 712 | 651 | 615 | 554 | 518 |
|  | 19 | 475 | 439 | 378 | 342 | 281 | 245 | 184 | 148 | 87 | 26 | "T" | 704 | 668 |
|  | 20 | 625 | 589 | 528 | 492 | 431 | 395 | 334 | 298 | 237 | 176 | 140 | 79 | 43 |
|  | 21 | "T" | 739 | 678 | 642 | 581 | 545 | 484 | 448 | 387 | 326 | 290 | 229 | 193 |
|  | 22 | 100 | 64 | 3 | "T" | 731 | 695 | 634 | 598 | 537 | 476 | 440 | 379 | 343 |
|  | 23 | 250 | 214 | 153 | 117 | 56 | 20 | "T" | 748 | 687 | 626 | 590 | 529 | 493 |
|  | 24 | 400 | 364 | 303 | 267 | 206 | 170 | 109 | 73 | 12 | "T" | 740 | 679 | 643 |
|  | 25 | 550 | 514 | 453 | 417 | 356 | 320 | 259 | 223 | 162 | 101 | 65 | 4 | "T" |
|  | 26 | 700 | 664 | 603 | 567 | 506 | 470 | 409 | 373 | 312 | 251 | 215 | 154 | 118 |
|  | 27 | 75 | 39 | "T" | 717 | 656 | 620 | 559 | 523 | 462 | 401 | 365 | 304 | 268 |
|  | 28 | 225 | 189 | 128 | 92 | 31 | "T" | 709 | 673 | 612 | 551 | 515 | 454 | 418 |
|  | 29 | 375 | 339 | 278 | 242 | 181 | 145 | 84 | 48 | "T" | 701 | 665 | 604 | 568 |
|  | 30 | 525 | 489 | 428 | 392 | 331 | 295 | 234 | 198 | 137 | 76 | 40 | "T" | 718 |
|  | 31 | 675 | 639 | 578 | 542 | 481 | 445 | 384 | 348 | 287 | 226 | 190 | 129 | 93 |

|  |  | 13 | 14 | 15 | 16 | 17 | 18 | 19 | 20 | 21 | 22 | 23 | 24 |
|---|---|---|---|---|---|---|---|---|---|---|---|---|---|
| A = | 0 | 182 | 146 | 85 | 49 | "T" | 702 | 666 | 605 | 569 | 508 | 472 | 411 |
|  | 1 | 332 | 296 | 235 | 199 | 138 | 77 | 41 | "T" | 719 | 658 | 622 | 561 |
|  | 2 | 482 | 446 | 385 | 349 | 288 | 227 | 191 | 130 | 94 | 33 | "T" | 711 |
|  | 3 | 632 | 596 | 535 | 499 | 438 | 377 | 341 | 280 | 244 | 183 | 147 | 86 |
|  | 4 | "T" | 746 | 685 | 649 | 588 | 527 | 491 | 430 | 394 | 333 | 297 | 236 |
|  | 5 | 107 | 71 | 10 | "T" | 738 | 677 | 641 | 580 | 544 | 483 | 447 | 386 |
|  | 6 | 257 | 221 | 160 | 124 | 63 | 2 | "T" | 730 | 694 | 633 | 597 | 536 |
|  | 7 | 407 | 371 | 310 | 274 | 213 | 152 | 116 | 55 | 19 | "T" | 747 | 686 |
|  | 8 | 557 | 521 | 460 | 424 | 363 | 302 | 266 | 205 | 169 | 108 | 72 | 11 |
|  | 9 | 707 | 671 | 610 | 574 | 513 | 452 | 416 | 355 | 319 | 258 | 222 | 161 |
|  | 10 | 82 | 46 | "T" | 724 | 663 | 602 | 566 | 505 | 469 | 408 | 372 | 311 |
|  | 11 | 232 | 196 | 135 | 99 | 38 | "T" | 716 | 655 | 619 | 558 | 522 | 461 |
|  | 12 | 382 | 346 | 285 | 249 | 188 | 127 | 91 | 30 | "T" | 708 | 672 | 611 |
|  | 13 | 532 | 496 | 435 | 399 | 338 | 277 | 241 | 180 | 144 | 83 | 47 | "T" |
|  | 14 | 682 | 646 | 585 | 549 | 488 | 427 | 391 | 330 | 294 | 233 | 197 | 136 |
|  | 15 | 7 | "T" | 735 | 699 | 638 | 577 | 541 | 480 | 444 | 383 | 347 | 286 |

TABLE 11-continued

Symbol indices within a Block, with Training Symbol = "T".

| | | | | | | | | | | | |
|---|---|---|---|---|---|---|---|---|---|---|---|
| 16 | 157 | 121 | 60  | 24  | "T" | 727 | 691 | 630 | 594 | 533 | 497 | 436 |
| 17 | 307 | 271 | 210 | 174 | 113 | 52  | 16  | "T" | 744 | 683 | 647 | 586 |
| 18 | 457 | 421 | 360 | 324 | 263 | 202 | 166 | 105 | 69  | 8   | "T" | 736 |
| 19 | 607 | 571 | 510 | 474 | 413 | 352 | 316 | 255 | 219 | 158 | 122 | 61  |
| 20 | "T" | 721 | 660 | 624 | 563 | 502 | 466 | 405 | 369 | 308 | 272 | 211 |
| 21 | 132 | 96  | 35  | "T" | 713 | 652 | 616 | 555 | 519 | 458 | 422 | 361 |
| 22 | 282 | 246 | 185 | 149 | 88  | 27  | "T" | 705 | 669 | 608 | 572 | 511 |
| 23 | 432 | 396 | 335 | 299 | 238 | 177 | 141 | 80  | 44  | "T" | 722 | 661 |
| 24 | 582 | 546 | 485 | 449 | 388 | 327 | 291 | 230 | 194 | 133 | 97  | 36  |
| 25 | 732 | 696 | 635 | 599 | 538 | 477 | 441 | 380 | 344 | 283 | 247 | 186 |
| 26 | 57  | 21  | "T" | 749 | 688 | 627 | 591 | 530 | 494 | 433 | 397 | 336 |
| 27 | 207 | 171 | 110 | 74  | 13  | "T" | 741 | 680 | 644 | 583 | 547 | 486 |
| 28 | 357 | 321 | 260 | 224 | 163 | 102 | 66  | 5   | "T" | 733 | 697 | 636 |
| 29 | 507 | 471 | 410 | 374 | 313 | 252 | 216 | 155 | 119 | 58  | 22  | "T" |
| 30 | 657 | 621 | 560 | 524 | 463 | 402 | 366 | 305 | 269 | 208 | 172 | 111 |
| 31 | 32  | "T" | 710 | 674 | 613 | 552 | 516 | 455 | 419 | 358 | 322 | 261 |

Figure 12:
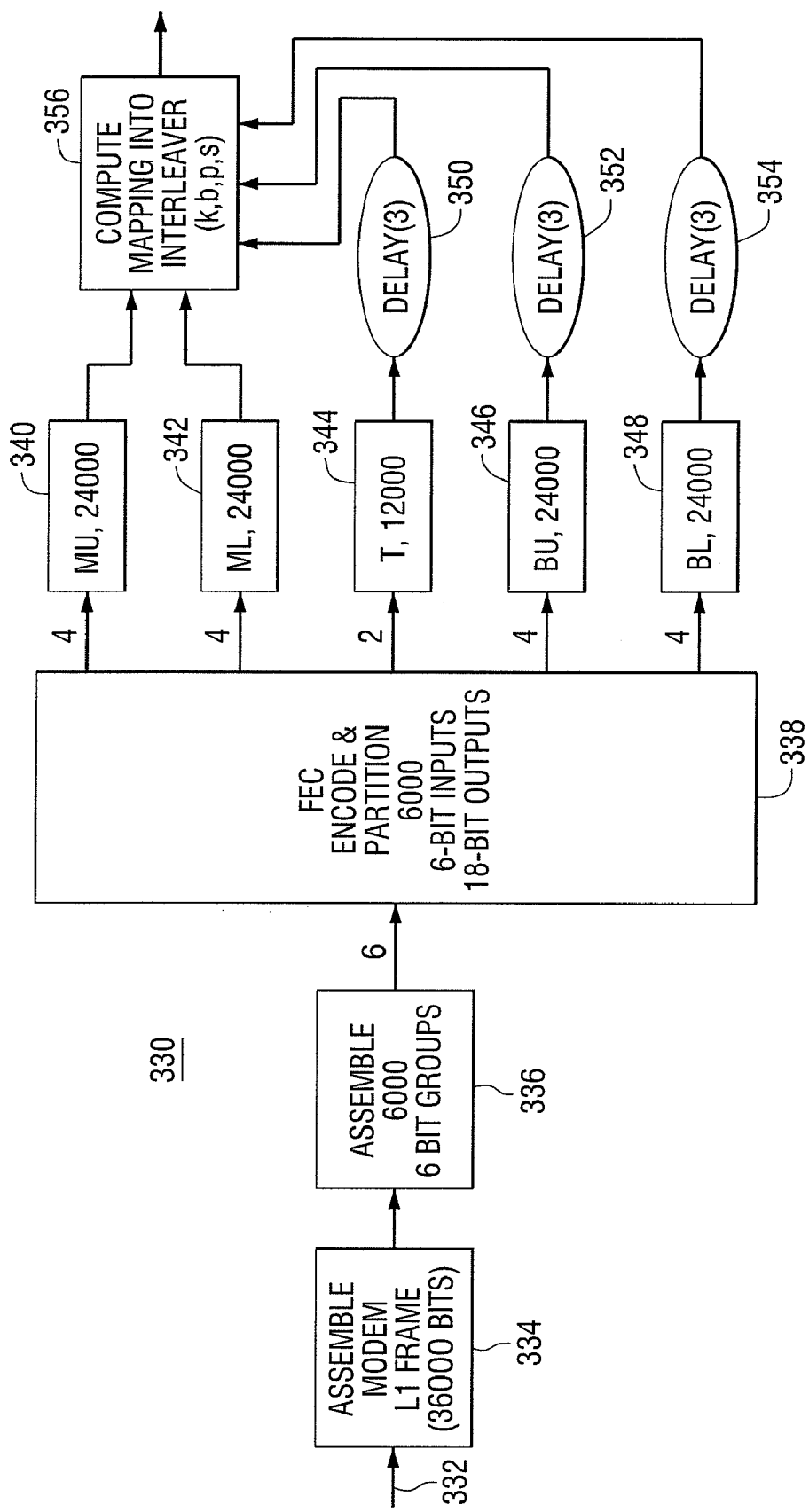
FIG. 12 is a block diagram illustrating the functionality of the forward error correction (FEC) and interleaver for a 24-kbps single stream AM IBOC system.
Figure 13:
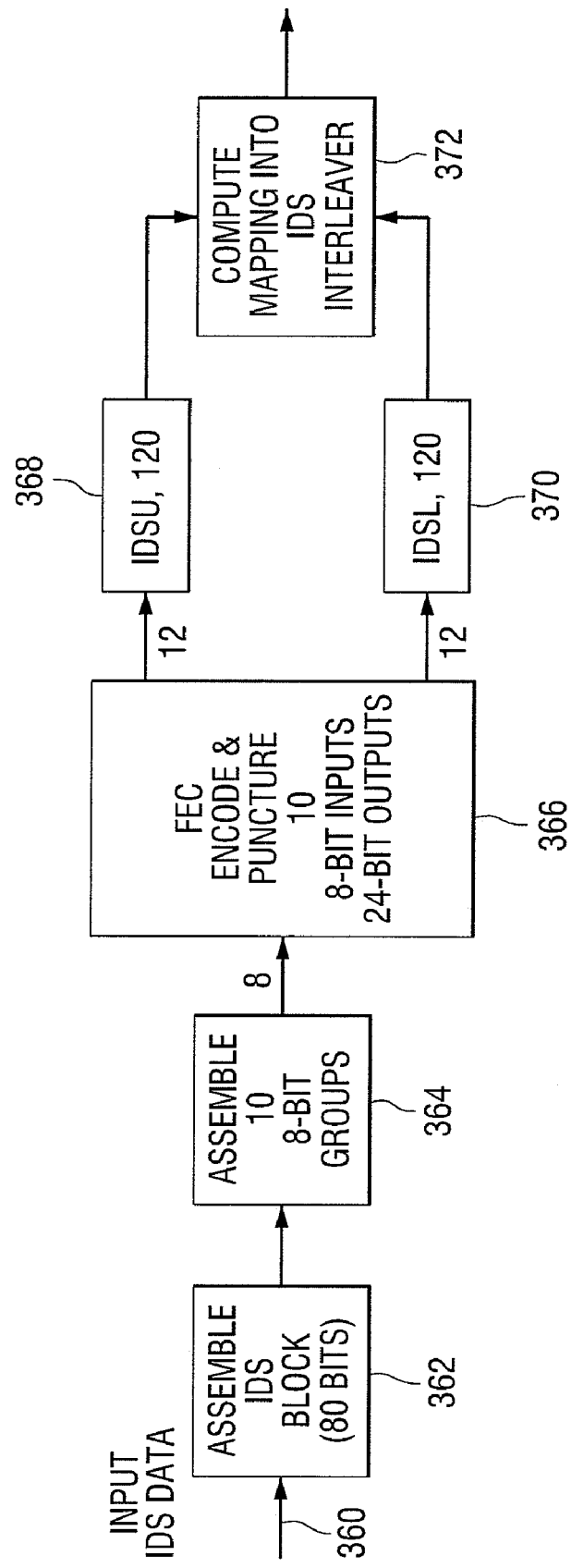
FIG. 13 is a block diagram illustrating the functionality of a forward error correction (FEC) interleaver for an integrated digital services (IDS) channel in an AM IBOC system.

FIGS. 12 and 13 illustrate the mapping of coded bits to interleaver partitions and blocks. In the illustrated example, 36000 information bits comprising each modem frame are coded and assembled in groups of bits from the puncture patterns described above. These groupings are mapped into the interleaver using the expressions presented Table 12.

The interleaver indices in this example are: k=block symbol index, 0 to 749 symbols in each block; b=block number, 0 to 7 within each modem frame; and p=16-QAM bit mapping within each 16-QAM symbol, (IA=0, IB=1, QA=2, QB=3) or QPSK bit mapping within each QPSK symbol, (I=0, Q=1), where I=in-phase, Q=quadrature, and 16 QAM is Gray-coded with MSB & LSB in each I or Q.

TABLE 12

Interleaver Mapping

| Partition $X_{k,b,p}$ | N, n = 0...N − 1 | k index in block b | b block # | p I&Q mapping |
|---|---|---|---|---|
| $MU_{k,b,p}$ | 24000 | mod[n + floor(n/6000), 750] | mod[3*n + floor(n/3000) + 2*floor(n/12000), 8] | mod(n, 4) |
| $ML_{k,b,p}$ | 24000 | mod[n + floor(n/6000) + 1,750] | mod[3*n + floor(n/3000) + 2*floor(n/12000) + 3, 8] | mod(n, 4) |
| $T_{k,b,p}$ | 12000 | mod[n + floor(n/750), 750] | floor(n/1500) (see note 1) | mod(n, 2) QPSK |
| $BU_{k,b,p}$ | 24000 | mod[n + floor(n/1500), 750] | floor(n/3000) (see note 1) | mod(n, 4) |
| $BL_{k,b,p}$ | 24000 | mod[n + floor(n/1500) + 1,750] | floor(n/3000) (see note 1) | mod(n, 4) |

FIG. 12 is a functional block diagram illustrating a forward error correction (FEC) interleaver 330 for a nominal 24-kbps single stream AM IBOC system. A digital signal is supplied on line 332 and assembled into a modem frame containing, for example, 3600 bits, as illustrated by block 334. The modem frame is then divided into a plurality of bit groups as illustrated by block 336, wherein the modem frame is shown to be divided into 6000 6-bit groups. The groups are then subjected to forward error encoding, puncturing, and partitioning as illustrated by block 338 to produce 8-bit outputs.

In the example illustrated in FIG. 12, each of the 6-bit groups results in a 18-bit output. The 18-bit groups are partitioned into main-upper, main-lower, tertiary, backup-upper and backup-lower partitions as illustrated by blocks 340, 342, 344, 346 and 348, for example by allocating four bits of each 18-bit group to each of the main upper, main lower, backup upper and backup lower partitions, and 2 bits to the tertiary partition. The tertiary, backup upper and backup lower bits are delayed by three modem frames as illustrated by blocks 350, 352 and 354 to create time diversity, and the bits are mapped into the interleaver as shown by block 356.

To map the IDS coded bits to interleaver partitions and blocks, the 80 IDS information bits comprising each block can be coded and assembled in groups of bits from the puncture patterns, as illustrated in FIG. 13. FIG. 13 shows the functionality of an FEC interleaver for the IDS channel. A digital signal is supplied on line 360 and assembled into a modem frame core containing, for example, 80 bits, as illustrated by block 362. The modem frame is then divided into a plurality of bit groups as illustrated by block 364, wherein the modem frame is shown to be divided into ten 8-bit groups. The groups are then subjected to forward error encoding and puncturing as illustrated by block 366. In this example, each of the 8-bit groups results in a 24-bit output. The 24-bit groups are then partitioned into IDS upper and IDS lower partitions as illustrated by blocks 368 and 370, for example by allocating six bits of each 12-bit group to each of the partitions. The IDS upper and IDS lower bits are then mapped into an enhancement interleaver as shown by block 372.

In this example, these groupings are mapped into the IDS interleaver using the expressions presented in Table 13. The IDS interleaver indices in this example are: k=block index, 0 to 29 symbols in each block, skipping the two training symbols (8 and 24) of 32 total; and p=16-QAM bit mapping within each 16-QAM symbol, (IA=0, IB=1, QA=2, QB=3).

TABLE 13

IDS Interleaver Mapping.

| Partition $X_{k,p}$ | N<br>n = 0 ... N − 1 | k<br>index in<br>IDS sequence | p<br>I&Q, ASK<br>mapping |
|---|---|---|---|
| $IDSU_{k,p}$ | 120 | mod(n + floor(n/60), 30) | mod(n, 4) |
| $IDSL_{k,p}$ | 120 | mod(n + floor(n/60) + 11, 30) | mod(n, 4) |

Interleaving within each IDS sequence spanning 32 OFDM symbols can be performed using the following expression for the row (vector) index:

$$\text{row}(k) = \mod\left[11 \cdot \left(k + \text{floor}\left(\frac{k}{15}\right)\right) + 3, 32\right]$$

$k = 0 ... 29$

IDS_interleaver =

|  |  |
|---|---|
| 0 | 22 |
| 1 | 25 |
| 2 | 28 |
| 3 | 0 |
| 4 | 3 |
| 5 | 6 |
| 6 | 9 |
| 7 | 12 |
| 8 | "T" |
| 9 | 17 |
| 10 | 20 |
| 11 | 23 |
| 12 | 26 |
| 13 | 29 |
| 14 | 1 |
| 15 | 4 |
| 16 | 7 |
| 17 | 10 |
| 18 | 13 |
| 19 | 15 |
| 20 | 18 |
| 21 | 21 |
| 22 | 24 |
| 23 | 27 |
| 24 | "T" |
| 25 | 2 |
| 26 | 5 |
| 27 | 8 |
| 28 | 11 |
| 29 | 14 |
| 30 | 16 |
| 31 | 19 |

The index k points to one of the 32 16-QAM symbols within the IDS sequence. Each of the 16-QAM symbols carries 4 code bits. Of the total of 32 symbols, 30 carry IDS information while the remaining 2 symbols are used for training symbols (locations 8 and 24).

Figure 14:
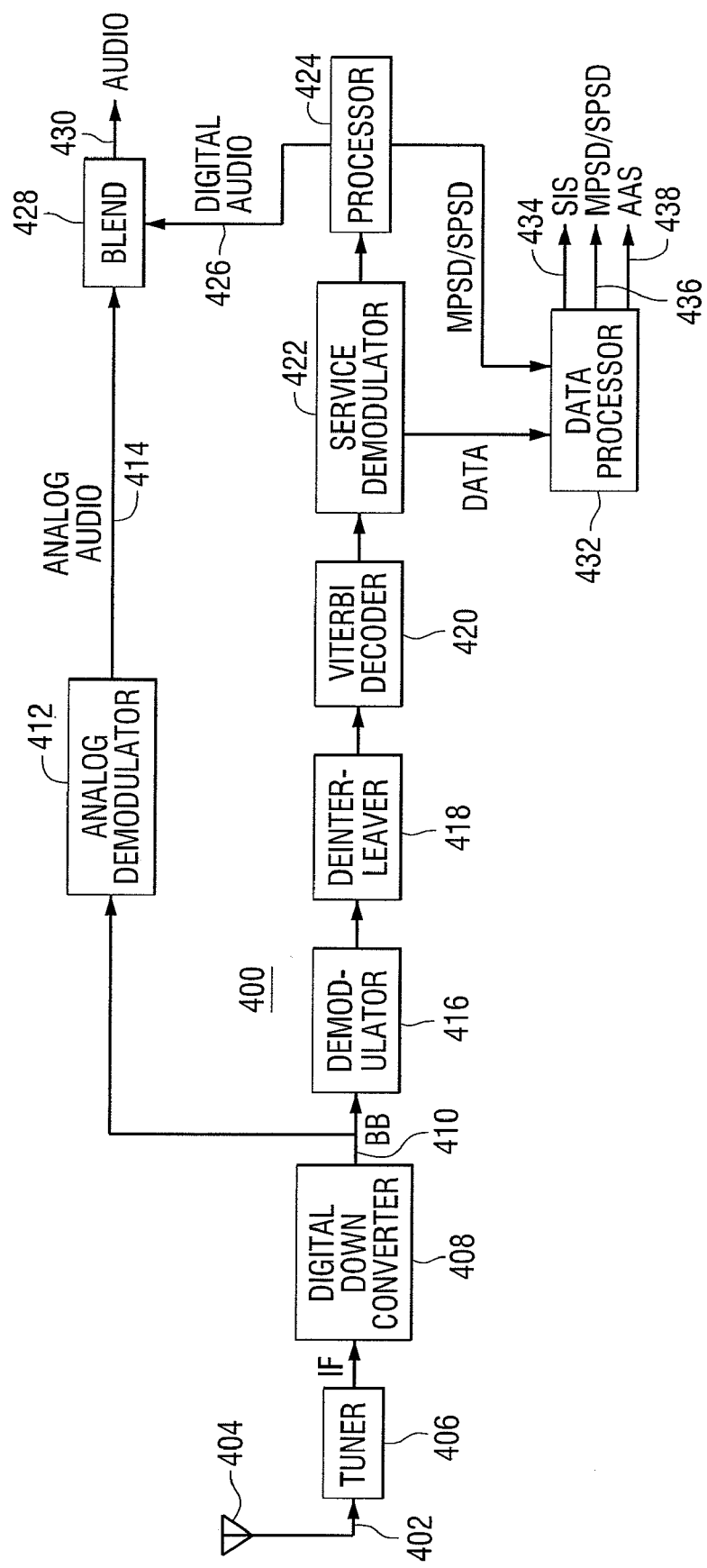
FIG. 14 is a simplified block diagram of relevant portions of an IBOC DAB receiver which can receive signals coded in accordance with the method of the present invention.

FIG. 14 is a simplified functional block diagram of an AM IBOC DAB receiver 400, which can receive signals coded in accordance with the method of the present invention. The receiver includes an input 402 connected to an antenna 404, a tuner or front end 406, and a digital down converter 408 for producing a baseband signal on line 410. An analog demodulator 412 demodulates the analog modulated portion of the baseband signal to produce an analog audio signal on line 414. A digital demodulator 416 demodulates the digitally modulated portion of the baseband signal. Then the digital signal is deinterleaved by a deinterleaver 418, and decoded by a Viterbi decoder 420. A service demodulator 422 separates main and supplemental program signals from data signals. A processor 424 processes the program signals to produce a digital audio signal on line 426. The analog and main digital audio signals are blended as shown in block 428, or a supplemental digital audio signal is passed through, to produce an audio output on line 430. A data processor 432 processes the data signals and produces data output signals on lines 434, 436 and 438. The data signals can include, for example, a station information service (SIS), main program service data (MPSD), supplemental program service data (SPSD), and one or more auxiliary application services (AAS).

Figure 15:
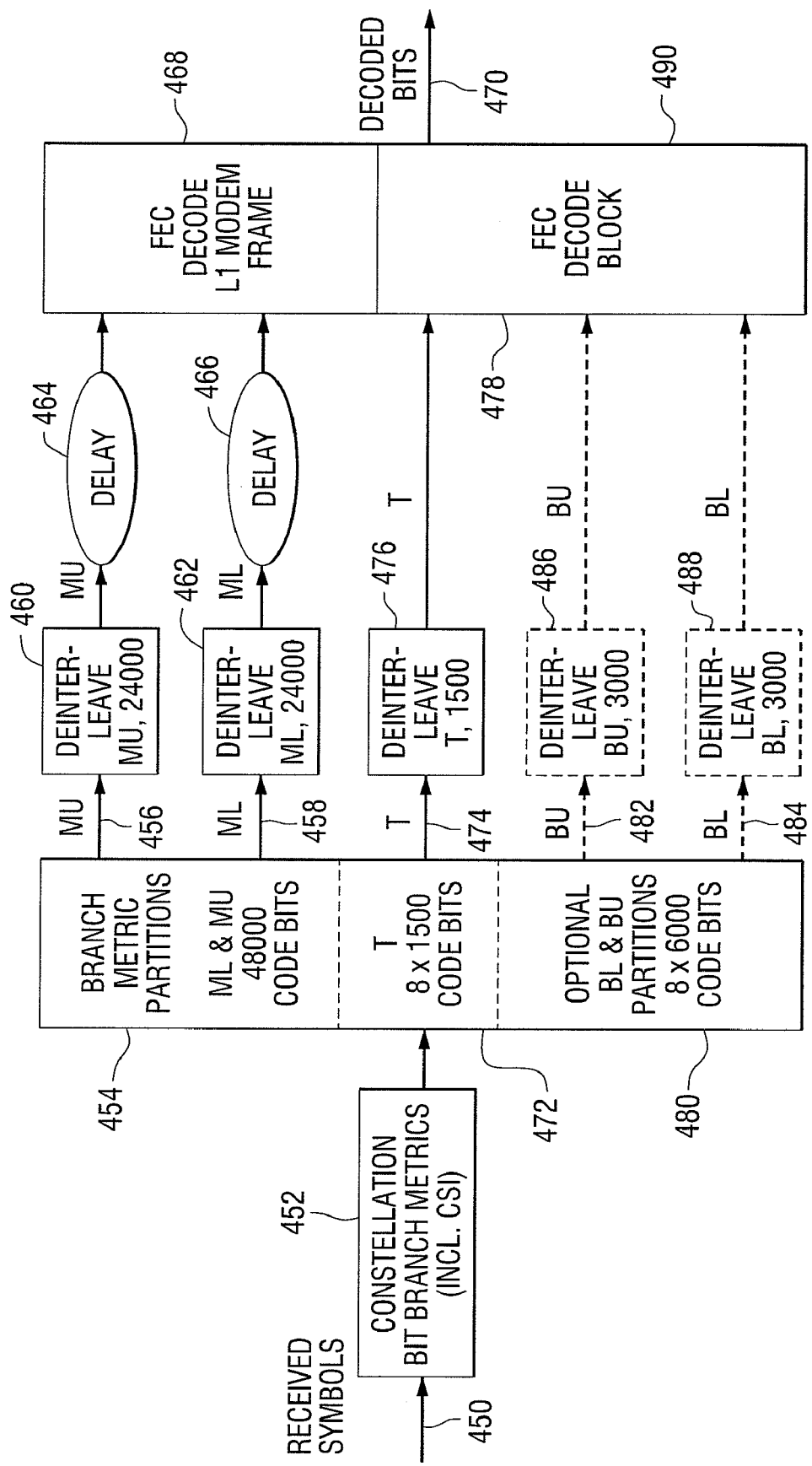
FIG. 15 is a block diagram illustrating the functionality of an AM IBOC hybrid deinterleaver and FEC decoder implementation that permits rapid acquisition of the audio information.
Figure 16:
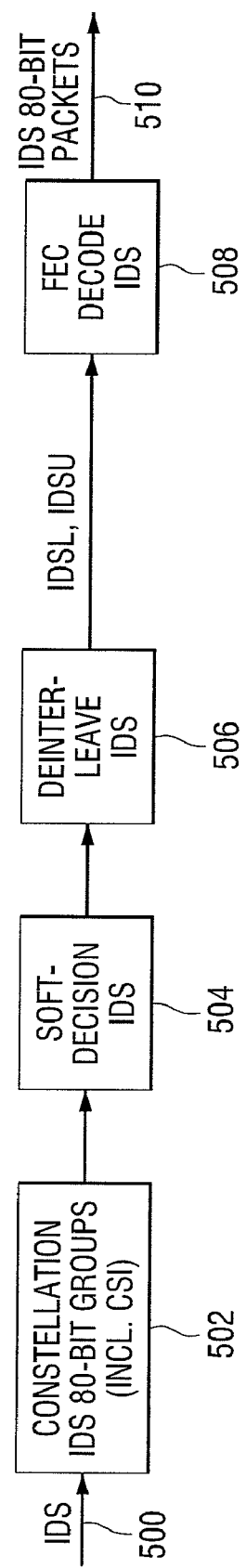
FIG. 16 is a block diagram illustrating the functionality of another AM IBOC hybrid deinterleaver and FEC decoder.

Functional block diagrams of the deinterleaver and FEC decoder portions of a receiver are shown in FIGS. 15 and 16. FIG. 15 is a functional block diagram of a hybrid deinterleaver and FEC decoder implementation that permits rapid acquisition of audio. The interleaved and forward error corrected symbols are received as an input on line 450 and subjected to constellation bit branch metrics including channel state information, as illustrated in block 452.

Unlike the transmitter that modulates code bits, the receiver must deal with noisy estimates of these code bits. These noisy estimates are processed in the receiver as branch metrics and channel state information (CSI) which are subsequently used by the convolutional (Viterbi) decoder to convert this noisy stream of branch metrics, weighted by CSI, into the original information bit sequence.

Block 454 shows that the branch metrics are partitioned into main upper and main lower partitions on lines 456 and 458. The partitioning is a key aspect of the CPTCM code design. Different partitions may be affected, or corrupted, by different interferers. Grouping the code bits into these partitions results in less performance loss than if these code bits were not partitioned. This is accomplished by ensuring good (punctured) FEC codes in the surviving partitions.

The main upper and main lower partitions are deinterleaved as shown in blocks 460 and 462 and delayed as illustrated by blocks 464 and 466. Then the delayed and the deinterleaved forward error corrected main upper and main lower signals are decoded as illustrated by block 268 to produce decoded bits on line 470.

Block 472 shows that the branch metrics are also partitioned into a tertiary partition on line 474. The tertiary partition is deinterleaved as shown in blocks 476. The deinterleaved tertiary signals are decoded as illustrated by block 478 to produce decoded bits on line 470.

Block 480 shows that the branch metrics are also partitioned into backup upper and backup lower partitions on lines 482 and 484. Then the deinterleaved forward error corrected backup upper and backup lower signals are deinterleaved as shown in blocks 486 and 488, and decoded as illustrated by block 490 to produce decoded bits on line 470.

FIG. 16 is a functional block diagram of the IDS deinterleaver and FEC decoder. The interleaved and forward error corrected IDS signal is input on line 500, and arranged in 80-bit groups as shown in block 502. Block 504 shows that soft decisions for the I and Q components are determined, and the I and Q soft decisions are deinterleaved in block 506. The deinterleaved forward error corrected IDS signals are decoded as illustrated by block 508 to produce the IDS data on line 510.

The constellation data at the input includes the I and Q values for each of the QAM symbols, which have been demodulated and normalized to the constellation grid. Channel state information (CSI) is associated with each I and Q value to permit subsequent soft-decision detection of the bits. The purpose of the delay elements in FIG. 15 is to time-align the main (MU and ML) audio information with the BU, BL and T audio information, which has already been delayed at the transmitter. The MU and ML blocks of bits are accumulated in an entire L1 modem frame prior to deinterleaving. The BU and BL are deinterleaved in blocks. Boxes 452, 472, 476, 480, 486, 488 and 490 in FIG. 15 indicate functions that must be processed on interleaver block boundaries (as opposed to L1 modem frame boundaries) in order to minimize delay in processing the backup or IDS data.

Since binary codes are used for CPTCM, it is necessary to obtain soft binary metrics from noisy M-ary symbols. The soft binary metrics can be obtained as described above for the 20 kHz or 30 kHz system.

The performance of a 24-kbps single stream can be compared to the 20 kbps core performance of the AM Hybrid MA1 codes described above for the 20 kHz and 30 kHz system. The most significant changes with the 24-kbps single stream system are in the symbol modulation, power levels, FEC coding, and the addition of a fifth, non-overlapping partition (T). Using the spectral allocations of FIG. 10, 16-QAM modulation can be implemented over the 100 primary and secondary subcarriers. The fifth QPSK partition (T) is employed in the tertiary region.

The power levels of the subcarriers are reduced to mitigate interference. Specifically the outer primary subcarriers are reduced by at least 10 dB relative to the previously known MA1 mode. Since the single stream is carried over all partitions, 3 dB is gained, making the power loss only 7 dB. Furthermore, the tertiary region power recovers the equivalent of 0.8 dB of the power loss in the composite code; however an extra 0.8 dB (coincidentally) is needed to carry 24 kbps over the 20 kbps current system.

Figure 17:
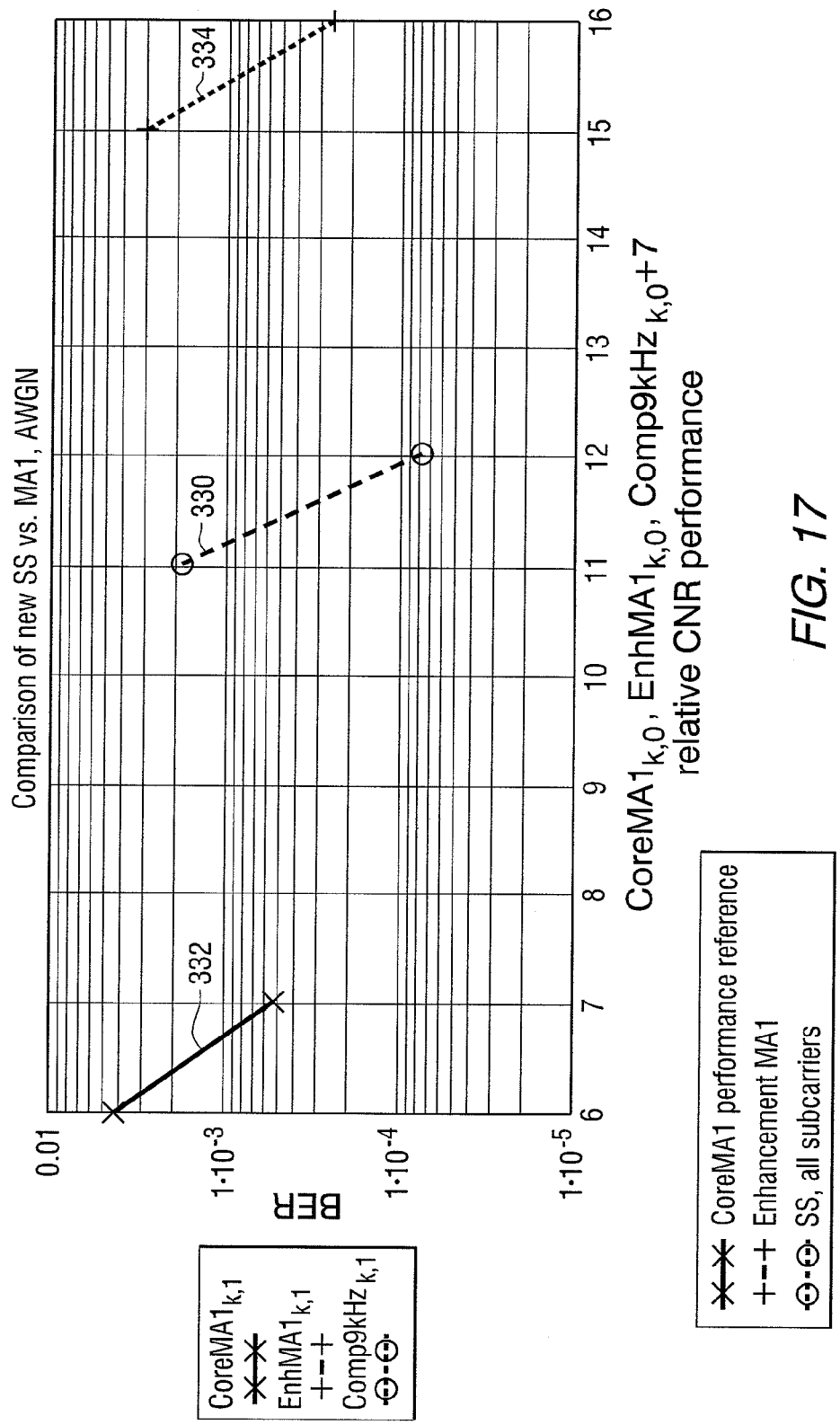
FIG. 17 is a plot illustrating Average White Gaussian Noise ("AWGN") performance of all partitions compared to current core and enhanced coverage.
Figure 18:
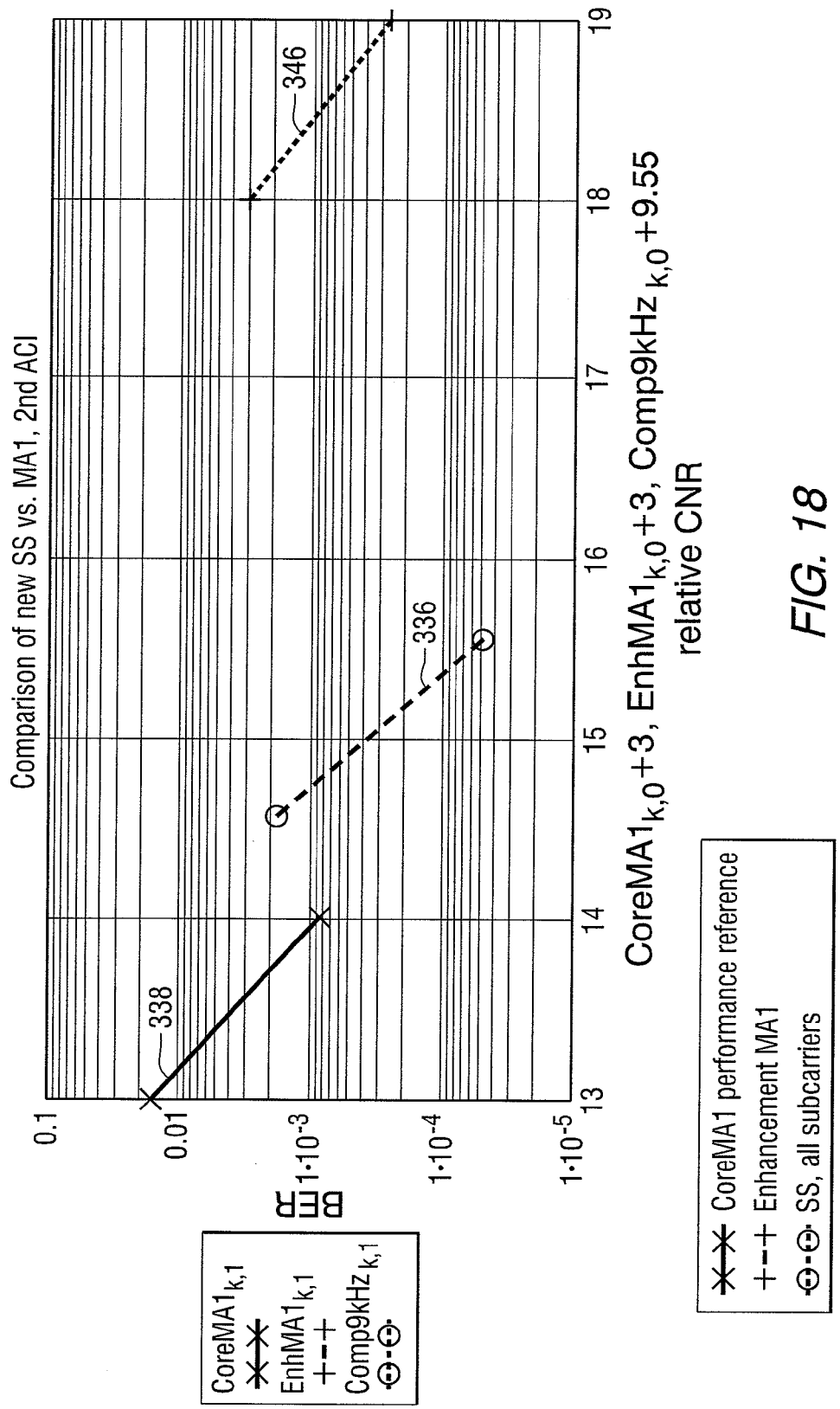
FIG. 18 is a plot illustrating AWGN performance in the presence of a strong second adjacent hybrid interferer.

The plots in FIGS. 17 and 18 illustrate a reduction in power and increase in throughput over a previously known system. FIG. 17 shows AWGN performance of all the partitions (Composite) as shown by line 530, compared to previously known core 532 and enhanced 534 coverage in a previously existing system. FIG. 18 shows AWGN performance of all the partitions (Composite) as shown by line 536, compared to previously known core 538 and enhanced 540 coverage in the presence of a strong second adjacent hybrid interferer.

The plot of FIG. 17 shows the performance of the previously known hybrid system compared to a single stream system implementation of this invention, after adjustments for power loss and bit rates. The results show that the single stream mode experiences approximately a 4.5 dB loss relative to the previous MA1 system in AWGN for core coverage. In comparison the MA1 Enhancement loses about 9 dB. In strong second adjacent interference, the relative loss is less than 1 dB, as shown in FIG. 18. However, the effect of the interference on the analog signal is reduced by 10 dB. The analog interference and mutual digital interference can be further reduced by reducing the power on the interfering primary partition. This would also benefit the performance for digital-to-digital interference. Furthermore, the 9 kHz mode in a real environment experiences lower tracking and equalization losses due to 16-QAM vs. 64 QAM. These performance scenarios can be quantified in actual testing.

In one aspect, this invention provides a 9 kHz mode for operation in regions where AM channels are spaced by a minimum of 9 kHz (not 10 kHz). The outer partition was moved in by 3 subcarriers (closing the null subcarriers around ±10 kHz). The 5 outer primary subcarriers are optional, further reducing the signal bandwidth for third adjacent interference compatibility.

The tertiary partition improves robustness in interference, and offsets the loss due to the reduction in outer primary partition power, which is reduced by 10 dB relative to the previous design. Furthermore, the outer primary partition modulation was changed from 64 QAM to 16 QAM, which reduces the Signal-to-Noise (SNR) requirement for detection by 6 dB. The remaining 4 dB (10 dB–6 dB) is offset by the tertiary partition.

The outer primary partition power has been reduced by at least 10 dB to reduce first and second adjacent channel interference, while increasing the single stream throughput to 24 kbps.

While the present invention has been described in terms of particular embodiments, it will be apparent to those skilled in the art that various changes can be made to the disclosed embodiments without departing from the scope of the invention as set forth in the following claims.

What is claimed is:

1. A method of receiving an AM compatible digital audio broadcasting signal, the method comprising:

using an antenna to receive an analog modulated carrier signal centrally positioned in a radio channel, and a plurality of digitally modulated subcarrier signals in the radio channel, wherein the digitally modulated subcarrier signals are modulated using complementary pattern-mapped trellis code modulation (CPTCM) including a code mapped to overlapping partitions including an upper main partition, a lower main partition, an upper backup partition and a lower backup partition, and a non-overlapping tertiary partition; and using a demodulator to demodulate the analog modulated carrier signal and the plurality of digitally modulated subcarrier signals; and using an output device to produce an output signal in response to the demodulating step.

2. The method of claim 1, wherein the code forms a single stream audio signal.

3. The method of claim 2, wherein the subcarrier signals in the upper backup partition and the lower backup partition are modulated using 16-QAM.

4. The method of claim 1, wherein the subcarriers include upper main subcarriers, lower main subcarriers, upper backup subcarriers, lower backup subcarriers, and tertiary subcarriers, with the power spectral density of each of the upper main subcarriers, lower main subcarriers, upper backup subcarriers, lower backup subcarriers, being at least 40 dBc below the power spectral density of an analog modulated carrier in the same channel as the subcarriers, and the power spectral density of each of the tertiary subcarriers, being at least 50 dBc below the power spectral density of the analog modulated carrier.

5. The method of claim 4, wherein the subcarriers further include timing subcarriers and integrated digital service subcarriers; and each of the subcarriers is located at one of a plurality of evenly spaced frequency locations, with the timing subcarriers being at locations +1 and −1, the upper tertiary subcarriers being at locations +2 through +26, the lower tertiary subcarriers being at locations −2 through −26, the upper main subcarriers being at locations +28 through +52, the lower main subcarriers being at locations −28 through −52, the upper backup subcarriers being at locations +54 through +78, the lower backup subcarriers being at locations −54 through −78, and the integrated digital service subcarriers being at locations +27, +53, −27 and −53.

6. The method of claim 4, wherein the subcarriers further include timing subcarriers and integrated digital service subcarriers; and each of the subcarriers is located at one of a plurality of evenly spaced frequency locations, with the timing subcarriers being at locations +1 and −1, the upper tertiary subcarriers being at locations +2 through +26, the lower tertiary subcarriers being at locations −2 through −26, the upper main subcarriers being at locations +28 through +52, the lower main subcarriers being at locations −28 through −52, the upper backup subcarriers being at locations +54 through +73, the lower backup subcarriers being at locations −54 through −73, and the integrated digital service subcarriers being at locations +27, +53, −27 and −53.

7. The method of claim 4, wherein the subcarriers further include timing subcarriers and integrated digital service subcarriers; and each of the subcarriers is located at one of a plurality of evenly spaced frequency locations, with the timing subcarriers being at locations +1 and −1, the upper tertiary subcarriers being at locations +2 through +26, the lower tertiary subcarriers being at locations −2 through −26, the upper main subcarriers being at locations +28 through +52, the lower main subcarriers being at locations −28 through −52, the upper backup subcarriers being at locations +57 through +81, the lower backup subcarriers being at locations −57 through −81, and the integrated digital service subcarriers being at locations +27, +53, −27 and −53.

8. A receiver receiving an AM compatible digital audio broadcasting signal, the receiver comprising:

an input for receiving an analog modulated carrier signal centrally positioned in a radio channel, and a plurality of digitally modulated subcarrier signals in the radio channel, wherein the digitally modulated subcarrier signals are modulated using complementary pattern-mapped trellis code modulation (CPTCM) including a code mapped to overlapping partitions including an upper main partition, a lower main partition, an upper backup partition and a lower backup partition, and a non-overlapping tertiary partition;

a demodulator for demodulating the plurality of subcarriers with the partitioned bits; and an output for producing an output signal in response to the demodulator.

9. The receiver of claim 8, wherein the code forms a single stream audio signal.

10. The receiver of claim 9, wherein the subcarrier signals in the upper backup partition and the lower backup partition are modulated using 16-QAM.

11. The receiver of claim 8, wherein the subcarriers include upper main subcarriers, lower main subcarriers, upper backup subcarriers, lower backup subcarriers, and tertiary subcarriers, with the power spectral density of each of the upper main subcarriers, lower main subcarriers, upper backup subcarriers, lower backup subcarriers, being at least 40 dBc below the power spectral density of an analog modulated carrier in the same channel as the subcarriers, and the power spectral density of each of the tertiary subcarriers, being at least 50 dBc below the power spectral density of the analog modulated carrier.

12. The receiver of claim 11, wherein the subcarriers further include timing subcarriers and integrated digital service subcarriers; and each of the subcarriers is located at one of a plurality of evenly spaced frequency locations, with the timing subcarriers being at locations +1 and −1, the upper tertiary subcarriers being at locations +2 through +26, the lower tertiary subcarriers being at locations −2 through −26, the upper main subcarriers being at locations +28 through +52, the lower main subcarriers being at locations −28 through −52, the upper backup subcarriers being at locations +54 through +78, the lower backup subcarriers being at locations −54 through −78, and the integrated digital service subcarriers being at locations +27, +53, −27 and −53.

13. The receiver of claim 11, wherein the subcarriers further include timing subcarriers and integrated digital service subcarriers; and each of the subcarriers is located at one of a plurality of evenly spaced frequency locations, with the timing subcarriers being at locations +1 and −1, the upper tertiary subcarriers being at locations +2 through +26, the lower tertiary subcarriers being at locations −2 through −26, the upper main subcarriers being at locations +28 through +52, the lower main subcarriers being at locations −28 through −52, the upper backup subcarriers being at locations +54 through +73, the lower backup subcarriers being at locations −54 through −73, and the integrated digital service subcarriers being at locations +27, +53, −27 and −53.

14. The receiver of claim 11, wherein the subcarriers further include timing subcarriers and integrated digital service subcarriers; and each of the subcarriers is located at one of a plurality of evenly spaced frequency locations, with the timing subcarriers being at locations +1 and −1, the upper tertiary subcarriers being at locations +2 through +26, the lower tertiary subcarriers being at locations −2 through −26, the upper main subcarriers being at locations +28 through +52, the lower main subcarriers being at locations −28 through −52, the upper backup subcarriers being at locations +57 through +81, the lower backup subcarriers being at locations −57 through −81, and the integrated digital service subcarriers being at locations +27, +53, −27 and −53.

* * * * *